United States Patent [19]

Long

[11] 3,901,682

[45] Aug. 26, 1975

[54] METHODS FOR INCREASING CROP YIELDS

[75] Inventor: James D. Long, Elkton, Md.

[73] Assignee: E. I. Du Pont de Nemours and Company, Wilmington, Del.

[22] Filed: Feb. 28, 1974

[21] Appl. No.: 446,801

Related U.S. Application Data

[63] Continuation-in-part of Ser. No. 414,878, Nov. 12, 1973, abandoned, which is a continuation-in-part of Ser. No. 348,320, April 5, 1973, abandoned.

[52] U.S. Cl. .......................................... 71/93; 71/88
[51] Int. Cl. .............................................. A01n 9/22
[58] Field of Search ........................................ 71/93

[56] References Cited
UNITED STATES PATENTS

| | | | |
|---|---|---|---|
| 3,040,044 | 6/1962 | Hirsch et al. ................ | 260/248 NS |
| 3,322,526 | 5/1967 | Loux ......................... | 71/93 |
| 3,462,257 | 8/1969 | McVey et al. ................ | 71/93 |
| 3,544,570 | 12/1970 | Timmler et al. .............. | 71/93 |
| 3,609,148 | 9/1971 | Holgerle et al. ............. | 260/248 NS |
| 3,758,468 | 9/1973 | Daams et al. ................ | 71/93 |

*Primary Examiner*—James O. Thomas, Jr.

[57] ABSTRACT

A method for increasing the yield of crops involving application of an s-triazinedione such as 3-(4-chlorophenyl)-6-methoxy-s-triazine-2,4(1H,3H)-dione. A preferred use of the invention is to increase the number of inflorescences or the number of grains per inflorescence on corn, wheat, and rye by applying the s-triazinedione to the plant at a time that will affect floral differentiation or development.

9 Claims, No Drawings

METHODS FOR INCREASING CROP YIELDS

CROSS-REFERENCE TO RELATED APPLICATIONS

This application is a continuation-in-part of application Ser. No. 414,878, filed Nov. 12, 1973, now abandoned, which is, in turn, a continuation-in-part of application Ser. No. 348,320, filed Apr. 5, 1973, now abandoned.

BACKGROUND OF THE INVENTION

Certain s-triazines have been found to enhance nitrogen uptake and metabolism and thereby increase grain yields under some circumstances (see, for example, C. J. Schweizer and S. K. Ries, Science 165, 73–75 (1967).

The s-triazinediones of this invention and their use as herbicides are disclosed and claimed in copending U.S. Pat. application Ser. No. 325,358, filed Jan. 22, 1973, by Julius J. Fuchs and Kang Lin and in copending U.S. Pat application Ser. No. 301,853, filed Oct. 30, 1972, by Fuchs and Lin (which is a continuation-in-part of U.S. Pat. application Ser. No. 268,767, filed July 3, 1972, now abandoned, which is in turn a continuation-in-part of U.S. Pat. application Ser. No. 181,202, filed Sept. 16, 1971, now abandoned). In addition, the use of the compounds of this invention in a method for altering plant flowering and sexual reproduction is disclosed and claimed in copending U.S. Patent application Ser. No. 325,359, filed Jan. 22, 1973, now abandoned, by David J. Fitzgerald and James D. Long and copending U.S. Patent application Ser. No. 301,852, filed Oct. 30, 1972, by Fitzgerald and Long.

It has now been discovered that these compounds are useful for increasing crop yields in that they increase the number of inflorescences or the number of seeds per inflorescence on cereal grains, soybeans, and dry beans.

SUMMARY OF THE INVENTION

This invention is a method of increasing the yield of various crops which comprises applying an s-triazinedione to the crop plant at a time that will result in the stimulation of inflorescence development and in an amount which is effective to increase the number of inflorescences produced or increase the number of seeds per inflorescence without causing substantial foliar burn, chlorosis, or necrosis, the s-triazinedione being a compound of the formula:

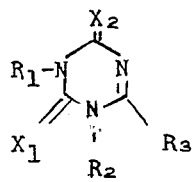

wherein $R_1$ is a straight chain alkyl of 1 through 3 carbon atoms, a branched chain alkyl of 3 through 8 carbon atoms, cycloalkyl of 3 through 8 carbon atoms, cycloalkylalkyl of 4 through 7 carbon atoms, alkenyl of 3 through 4 carbon atoms, alkynyl of 3 through 4 carbon atoms, benzyl or

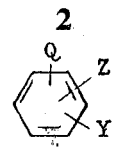

wherein

Y is hydrogen, halogen, alkyl of 1 through 4 carbon atoms, nitro, alkoxy of 1 through 4 carbon atoms, alkylthio of 1 through 4 carbon atoms, cyano or trifluoromethyl;

Z is hydrogen, halogen, methyl, ethyl, nitro, methoxy, or methylthio; and

Q is hydrogen, halogen, or methyl;

$R_2$ is hydrogen, alkyl of 1 through 4 carbon atoms, or a group

where A is alkyl of 1 through 3 carbon atoms or alkoxy or alkylthio of 1 through 4 carbon atoms, or a cation selected from lithium, sodium, potassium, calcium magnesium, barium, or

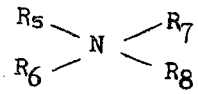

where $R_5$, $R_6$, and $R_7$ can be the same or different and each can be hydrogen, alkyl of 1 through 4 carbon atoms, or hydroxy alkyl of 2 through 4 carbon atoms; and $R_8$ is hydrogen, alkyl of 1 through 12 carbon atoms, or benzyl; $R_5$ and $R_6$ can be taken together to form a ring that is —$(CH_2)_2$—O—$(CH_2)_2$— or —$(CH_2)_n$— where $n$ is 4–6 and $R_7$ and $R_8$ are H;

$R_3$ is $SR_4$ or $OR_4$ where, when $R_1$ is phenyl on substituted phenyl, $R_4$ is methyl or ethyl, and when $R_1$ is other than phenyl or substituted phenyl, $R_4$ is alkyl of 1 through 6 carbon atoms, cycloalkyl of 3 through 6 carbon atoms, alkenyl of 3 through 4 carbon atoms, alkynyl of 3 through 4 carbon atoms, or benzyl, and $X_1$ and $X_2$ are oxygen or sulfur.

In particular, this invention is a method for increasing the yield of crops (such as corn, wheat, rye, rice, barley, oats, sorghum, dry beans, and soybeans) which comprises applying an s-triazinedione of Formula I to the crop during inflorescence initiation or early development in an amount sufficient to increase the number of inflorescences produced or increase the number of seeds per inflorescence but insufficient to cause substantial foliar burn, chlorosis, or necrosis.

A preferred embodiment of this invention is a method of increasing the yield of corn, wheat, or rye which comprises applying an s-triazinedione of Formula I to corn, wheat, or rye during inflorescence initiation or early development in an amount sufficient to increase the number of inflorescences produced or increase the number of grains per inflorescence but insufficient to cause substantial foliar burn, chlorosis, or necrosis.

DETAILED DESCRIPTION OF THE INVENTION

Preferred Compounds

Certain of the compounds of Formula I are preferred because of their higher activity and their ease of synthesis. These include compounds of Formula I where:

$R_1$ is phenyl or substituted phenyl as given above, and
$R_2$ is hydrogen or a cation as given above.

More preferred because of their higher activity are those compounds within the preferred scope where:

$R_1$ is monohalophenyl or dihalophenyl, and
$R_2$ is hydrogen or a cation as given above.

Most preferred compounds include:
3-(4-chlorophenyl)-6-methoxy-s-triazine-2,4(1H,3H)-dione and salts thereof.

Synthesis of the Compounds

The compounds of Formula I where $X_1 = X_2 =$ oxygen can be prepared by the process illustrated by the following equations:

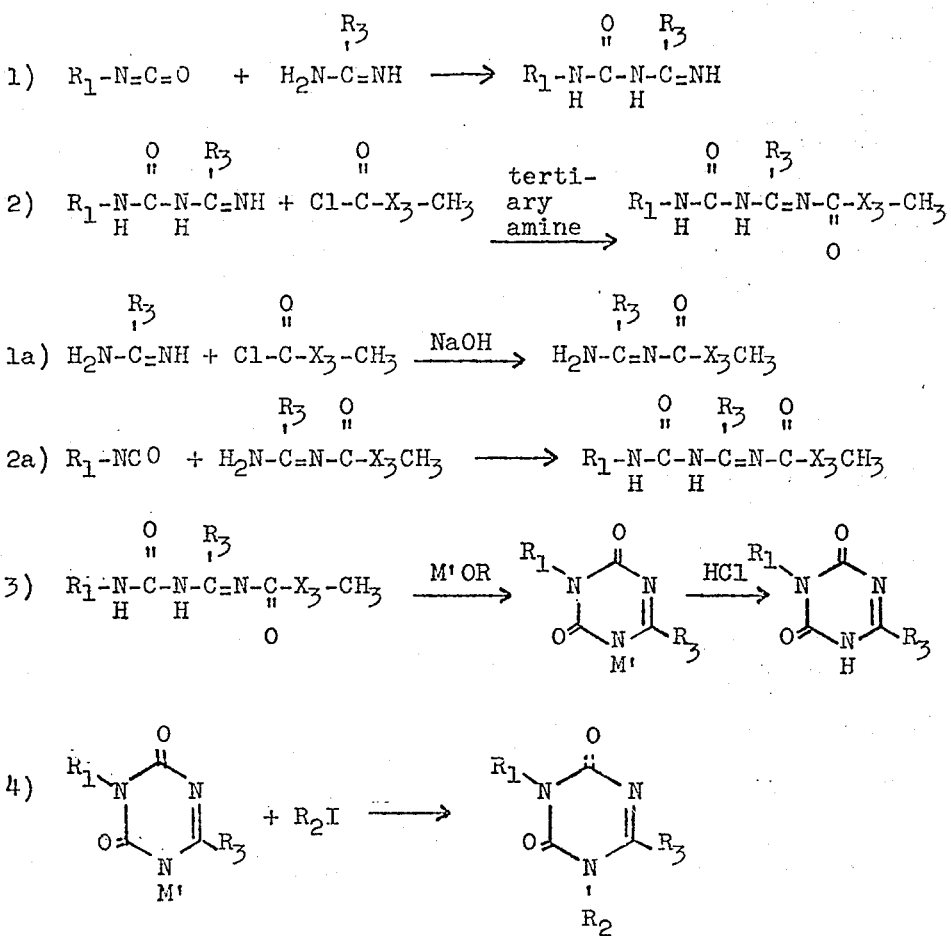

where:
$R_1$, $R_2$, and $R_3$ are as previously defined;
$X_3$ is oxygen or sulfur;
M' is an alkali metal; and
R is hydrogen or alkyl of 1 through 4 carbon atoms.

The synthesis of 1-thioallophanimidates and 1,3-dithioallophanimidates from thiopseudourea [equation 1)] are performed analogous to a procedure given in Organic Synthesis 42, 87 (1962), which describes the preparation of methyl 4-phenyl-3-thioallophanimidate (1-phenyl-2-thio-4-methylisobiuret).

The reaction products of equation 1) are allowed to react at about 0°–45°C and atmospheric pressure in an inert organic solvent, e.g., methylene chloride, with one equivalent of a chloroformate or a chlorothiolformate in the presence of one equivalent of an acid acceptor such as triethylamine, trimethylamine or dimethylaniline [equation 2)]. After the completion of the reaction, the methylene chloride solution is washed with water, dried, and the solvent evaporated to give alkoxycarbonylthioallophanimidates, alkylthiolcarbonylthioallophanimidates, alkoxycarbonylallophanimidates and alkylthiolcarbonylallophanimidates.

The reaction products of equation 2) are also obtained by reacting the pseudourea or thiopseudourea first with a chloroformate or a chlorothiolformate as in equation 1a), and then reacting the reaction products of equation 1a) with an isocyanate as in equation 2a).

The reaction products of equation 2) are then refluxed for a short time with an alkali metal alkoxide or hydroxide such as sodium or potassium methoxide or hydroxide in methanol to effect cyclization [equation 3)]. The solvent is evaporated under vacuum; the residue is washed with ether or dissolved in water and acidified. Acidification of the aqueous solution usually precipitates the desired s-triazinedione as an essentially pure solid. If the desired compound does not precipitate upon acidification, it is extracted into methylene chloride. The solvent is then evaporated and the dried residue is recrystallized. The essentially pure alkali metal salt (corresponding to the alkali metal in the alkoxide or hydroxide) is obtained by washing the residue with ether and filtering the resulting solid. The same alkali metal salts are also obtained by dissolving the s-triazinediones in methanol containing one equivalent of alkali metal alkoxide or hydroxide such as sodium methoxide or hydroxide followed by evaporation of methanol. The alkali metal salts of s-traizinediones react with alkyl halides, sulfates, or tosylates to provide the 1-alkyl analogs of the this invention [equation 4)]. Both components are refluxed at about 50°–153°C in an appropriate inert organic solvent such as tetrahydrofuran, dimethylformamide, or acetonitrile for 5–10 hours. The solvent is evaporated and the residue dissolved in methylene chloride. The methylene chloride solution is washed with water, dried and evaporated to provide the 1-alkyl analogs of this invention in an essentially pure state.

The compounds of Formula I can also be prepared by the process illustrated by the following equations:

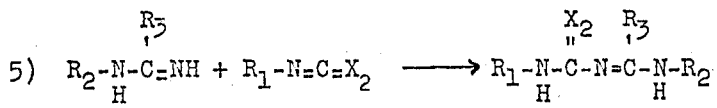

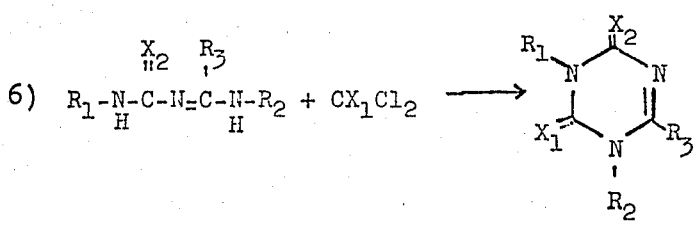

The synthesis of 1,2-dialkylpseudourea or 1,2-dialkyl-2-thiopseudourea are performed by a process analogous to the procedure given in J. Chem. Soc. 3551 (1955). The pseudourea is reacted with an isocyanate or an isothiocyanate as in equation 1). The reaction product of equation 5) is reacted with phosgene or thiophosgene at about 0°–100°C in the presence of a base such as triethylamine or N,N-dimethylaniline to give the s-triazine-2,4(1H,3H)-diones, thio-s-triazine-2,4(1H,3H)-diones, and s-triazines-2,4(1H,3H)-dithiones of the present invention.

The s-triazine-4-thio-2,4(1H,3H)-diones and s-triazine-2,4(1H,3H)-dithiones of the present invention can also be prepared by the process illustrated by the following equation:

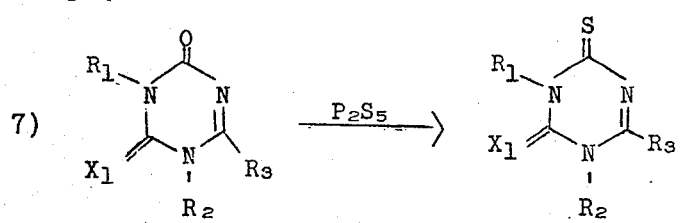

A s-triazine-2,4(1H,3H)-dione is reacted with phosphorus pentasulfide at about 25°–125°C in a solvent such as pyridine to produce the desired s-triazine-4-thio-2,4(1H,3H)-dione. The solvent is removed by evaporation and the residue recrystallized in a solvent such as benzene.

The s-triazinediones of the following formula

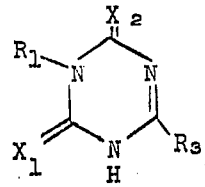

form salts which are useful alone or can be reacted with an acyl chloride, an alkyl chloroformate, or an alkyl chlorothioformate to give 1-substituted analogs as illustrated by the following equations:

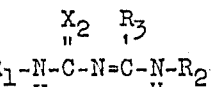

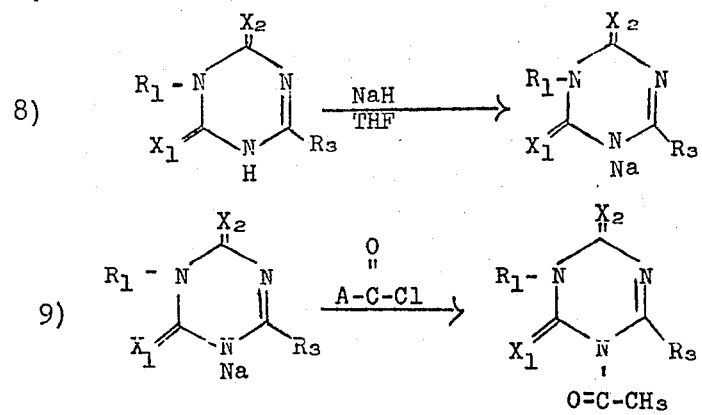

wherein A is an alkyl, alkylthio, or alkoxy group.

The following examples illustrate the processes described above. All parts are parts by weight unless otherwise indicated.

EXAMPLE 1

3-tert-Butyl-6-methylthio-s-triazine-2,4(1H,3H)-dione

To a solution of 139 parts of 2-methyl-2-thiopseudourea sulfate in 1000 parts of 50% aqueous methanol at 0°C is added dropwise 88 parts of 50% sodium hydroxide, followed by 90 parts tert-butyl isocyanate in 200 parts tetrahydrofuran. The solution is concentrated at reduced pressure and filtered to yield, after drying 90 parts of methyl 4-tert-butyl-1-thioallophanimidate melting at 102°–104°C.

To a solution of 5.67 parts of the above compound and 4 parts of triethylamine in 50 parts methylene chloride at 0°C is added dropwise 3.3 parts methyl chlorothiolformate in 5 parts of methylene chloride. The solution is stirred overnight and washed once with water. After drying and evaporation of the solvent, there is obtained 3.8 parts methyl 4-tertbutyl-N-methylthiolcarbonyl-1-thioallophanimidate melting at 102°–105°C.

A solution of five parts of the above compound in 50 parts of methanol containing 3 parts of sodium methoxide is refluxed for one hour. The reaction mixture is then cooled and the methanol is evaporated at reduced pressure. One hundred parts of water are added and the solution twice extracted with 50 parts of ether. The aqueous layer is then neutralized at 0° to 5°C with hydrochloric acid and extracted with methylene chloride. The methylene chloride extract is dried and the solvent evaporated to give 3 parts of 3-tert-butyl-6-methylthio-s-triazine-2,4(1H,3H)-dione, melting at 1120°–115°C.

EXAMPLE 2

3-Isopropyl-6-methylthio-s-triazine-2,4(1H,3H)-dione

To a solution of 69.5 parts of 2-methyl-2-thiopseudourea sulfate and 47 parts of methyl chloroformate in 1000 parts of water at 0°C is added dropwise 56.9 parts of potassium hydroxide in 200 parts of water. The reaction mixture is stirred at room temperature for 3 hours and then extracted with methylene chloride. The methylene chloride extract is dried and the solvent evaporated at reduced pressure to give 45 g of methyl N-(1-amino-1-methylthiomethylene)-carbamate melting at 72°–77°C.

A solution of seventy-four parts of the above compound and 47 parts of isopropyl isocyanate in 300 parts methylene chloride is stirred overnight. The solvent is evaporated to give 113.6 parts of methyl 4-isopropyl-N-methoxycarbonyl-1-thioallophanimidate melting at 129°–132°C.

A solution of one hundred parts of the above compound in 200 parts of methanol containing 27 parts of sodium methoxide is refluxed for one hour. The methanol is evaporated under vacuum and the residue dissolved in 200 parts of water. The aqueous solution is neutralized with hydrochloric acid to afford after filtration and drying 55 parts of 3-isopropyl-6-methylthio-s-triazine-2,4(1H,3H)-dione melting at 188°–190°C.

EXAMPLE 3

3-Methyl-6-methylthio-s-triazine-2,4(1H,3H)-dione

To a solution of 69.5 parts of 2-methyl-2-thiopseudourea sulfate and 110 parts of methyl chlorothiolformate in 500 ml of water is added dropwise at 0–5°C 120 parts of 50% sodium hydroxide. The reaction mixture is stirred at 0°–5°C for 1 hour and then at room temperature for 2 hours. The solution is then extracted with methylene chloride and the organic extract dried and evaporated under vacuum to give 47 parts of methyl N-(1-amino-1-methylthiomethylene)-thiolcarbamate melting at 75°–76°C.

To a solution of 8.2 parts of the above compound in 75 parts of methylene chloride is added 3.1 parts of methyl isocyanate. The reaction mixture is stirred at room temperature for 3 hours, and then the solvent evaporated under vacuum to give 10 parts of methyl 4-methyl-N-methylthiolcarbonyl-1-thiolallophanimidate melting at 115°–117°C.

A solution of six parts of the above compound in 75 parts of methanol containing 4.5 parts sodium methoxide is refluxed for 1 hour. The methanol is evaporated and the residue dissolved in water. The aqueous solution is then neutralized with hydrochloric acid at 0°–5°C. The precipitate is collected by filtration and dried to give 2.3 parts of 3-methyl-6-methylthio-s-triazine-2,4(1H,3H)-dione melting at 243°–244°C.

EXAMPLE 4

3-(p-Chlorophenyl)-6-methylthio-s-triazine-2,4-(1H,3H)-dione

To a solution of 148 parts of methyl N-(1-amino-1-methylthiomethylene)-carbamate, prepared as in Example 2, in 2,000 parts methylene chloride is added 154 parts of p-chlorophenyl isocyanate. The reaction is stirred for 3 days. Then to it is added 54 parts of sodium methoxide in 540 parts of methanol. The reaction mixture is then refluxed for 1 hour. The reaction mass is cooled, and 2,000 parts of ether are added. The solid collected by filtration is dissolved in water and the solution neutralized with hydrochloric acid. The new solid thus formed is collected, dried, and recrystallized from ethanol/$H_2O$ to give 140 parts of 3-(p-chlorophenyl)-6-methylthio-s-triazine-2,4(1H,3H)-dione melting at 292°–295°C.

EXAMPLE 5

3-sec-Butyl-6-methylthio-s-triazine-2,4(1H,3H)-dione

To a solution of 7.2 parts of methyl N-(1-amino-1-methylthiomethylene)carbamate, prepared as in Example 2, in 50 parts of methylene chloride is added 5.5 parts of sec-butyl isocyanate. The reaction mixture is stirred overnight and the solvent evaporated to give 12 parts of crude methyl 4-sec-butyl-N-methoxycarbonyl-1-thioallophanimidate melting at 102°–104°C.

The above product is refluxed for 1 hour in 150 parts of methanol containing 6 parts of sodium methoxide. The solvent is evaporated under vacuum and the residue is dissolved in 100 parts of water. The aqueous solution is extracted with methylene chloride and the aqueous layer then neutralized at 0°–5°C with hydrochloric acid. The aqueous solution is extracted again with methylene chloride. The extract is dried and the methylene chloride evaporated to give 7 parts of a solid melting at 124°–132°C. Recrystallization from chlorobutane gives 4 parts of 3-sec-butyl-6-methylthio-s-triazine-2,4(1H,3H)-dione, melting at 133.5°–135.5°C.

EXAMPLE 6

3-(p-Chlorophenyl)-6-methoxy-s-triazine-2,4(1H,3H)-dione

To 52 parts of 2-methylpseudourea hydrogen sulfate in 250 parts of water at 0°–5°C is added 31 parts of methyl chloroformate followed by dropwise addition of 74 parts of 50% sodium hydroxide. The reaction mass is stirred at room temperature for 3 hours and then extracted with methylene chloride. The methylene chloride extract is dried and the solvent evaporated. The residue is triturated with hexane to give 23 parts of methyl N-(1-amino-1-methoxy-methylene)-carbamate melting at 36°–39.5°C.

To 13 parts of the compound prepared above in 200 ml of methylene chloride is added 15 parts of p-chlorophenyl isocyanate. The reaction mass is stirred overnight. The solvent is evaporated and the residue refluxed overnight in 100 parts of 10% sodium methoxide in methanol. Water is added and the solution neutralized with hydrochloric acid. The crude solid collected by filtration is recrystallized from acetonitrile to give 7 parts of 3-(p-chlorophenyl)-6-methoxy-s-triazine-2,4(1H,3H)-dione melting at 238°–241°C.

EXAMPLE 7

3-(2-Methyl-4-chlorophenyl)-6-methoxy-s-triazine-2,4(1H,3H)-dione

To 20 parts of methyl N-(1-amino-1-methoxymethylene)-carbonate prepared as in Example 6 in 200 parts of methylene chloride is added 25 parts of 2-methyl-4-chlorophenyl isocyanate. It is stirred overnight and 8 parts sodium methoxide in 80 parts of methanol is added. It is refluxed for 1 hour and the solid is collected by filtration. It is dissolved in water and the solution neutralized at 0°–5°C. with concentrated hydrochloric acid. The precipitate is collected by filtration to give 25 parts of 3-(2-methyl-4-chlorophenyl)-6-methoxy-s-triazine-2,4(1H,3H)-dione melting at 193°–195°C.

EXAMPLE 8

3-(o-Fluorophenyl)-6-methylthio-s-triazine-2,4(1H,3H)-dione

To a solution of 16 parts of methyl N-(1-amino-1-methylthiomethylene)carbamate, prepared as in Example 2, in 150 parts of methylene chloride is added 15 parts of o-fluorophenyl isocyanate. The reaction mixture is stirred overnight and the solvent evaporated to give after trituration with hexane 29 parts of methyl 4-(o-fluorophenyl)-N-methoxycarbonyl-1-thioallophanimidate melting at 123°–125°C.

Sixteen parts of the above product are refluxed for 1 hour in 150 parts of methanol containing 9 parts of sodium methoxide. The solvent is evaporated under vacuum and the residue is dissolved in 200 parts of water. The aqueous solution is extracted with methylene chloride and the aqueous layer then neutralized at 0°–5°C. with hydrochloric acid. The precipitate is collected and dried to give 11 parts of 3-(o-fluorophenyl)-6-methylthio-s-triazine-2,4(1H,3H)-dione melting at 196°–199°C.

EXAMPLE 9

The following s-triazinediones can be prepared by the procedure of Example 2 by substituting the listed 2-substituted thiopseudoureas and pseudoureas, for 2-methyl-2-thiopseudourea, by using various chloroformates and by replacing isopropyl isocyanate with various isocyanates or isothiocyanates.

| Thiopseudourea or Pseudourea | Isocyanate or Isothiocyanate | Formates | s-Triazinediones |
|---|---|---|---|
| 2-methyl-2-thiopseudourea | ethyl isocyanate | methyl chloroformate | 3-ethyl-6-methylthio-s-triazine-2,4-(1H,3H)-dione, m.p. 190–191° |
| " | phenyl isocyanate | " | 3-phenyl-6-methylthio-s-triazine-2,4-(1H,3H)-dione, m.p. 235–245° |
| " | cyclohexyl isocyanate | " | 3-cyclohexyl-6-methylthio-s-triazine-2,4(1H,3H)-dione, m.p. 255–257° |
| " | o-fluorophenyl isocyanate | " | 3-(o-fluorophenyl)-6-methylthio-s-triazine-2,4(1H,3H)-dione, m.p. 196–199° |
| " | o-nitrophenyl isocyanate | " | 3-(o-nitrophenyl)-6-methylthio-s-triazine-2,4(1H,3H)-dione, m.p. 196–202° |
| " | propyl isocyanate | " | 3-propyl-6-methylthio-s-triazine-2,4(1H,3H)-dione, m.p. 145–148° |
| " | m-tolyl isocyanate | " | 3-(m-tolyl)-6-methylthio-s-triazine-2,4(1H,3H)-dione, m.p. 176–180° |
| " | allyl isocyanate | " | 3-allyl-6-methylthio-s-triazine-2,4(-1H,3H)-dione, m.p. 140–142° |
| " | 3,4-dichlorophenyl isocyanate | " | 3-(3,4-dichlorophenyl)-6-methylthio-s-triazine-2,4(1H,3H)-dione, m.p. 269–271° |
| " | p-fluorophenyl isocyanate | " | 3-(p-fluorophenyl)-6-methylthio-s-triazine-2,4(1H,3H)-dione, m.p. 239–243° |
| " | p-nitrophenyl isocyanate | " | 3-(p-nitrophenyl)-6-methylthio-s-triazine-2,4(1H,3H)-dione, m.p. 279–280.5° |
| " | p-bromophenyl isocyanate | " | 3-(p-bromophenyl)-6-methylthio-s-triazine-2,4(1H,3H)-dione, m.p. 272–273° |
| " | o-chlorophenyl isocyanate | " | 3-(o-chlorophenyl)-6-methylthio-s-triazine-2,4(1H,3H)-dione, m.p. 212.5–214° |
| " | m-chlorophenyl isocyanate | " | 3-(m-chlorophenyl)-6-methylthio-s-triazine-2,4(1H,3H)-dione, m.p. 192–195.5° |
| " | cyclohexylmethyl isocyanate | " | 3-cyclohexylmethyl-6-methylthio-s-triazine-2,4(1H,3H)-dione, m.p. 177.5–178° |
| 2-allyl-2-thiopseudourea | isopropyl isocyanate | " | 3-isopropyl-6-allylthio-s-triazine-2,4(1H,3H)-dione, m.p. 140–142° |
| 2-methylpseudourea | phenyl isocyanate | " | 3-phenyl-6-methoxy-s-triazine-2,4(1H,3H)-dione, m.p. 198–200° |
| " | cyclohexyl isocyanate | " | 3-cyclohexyl-6-methoxy-s-triazine-2,4(1H,3H)-dione, m.p. 212–220° |
| " | p-fluorophenyl isocyanate | " | 3-(p-fluorophenyl)-6-methoxy-s-triazine-2,4(1H,3H)-dione, m.p. 234–237° |
| " | m-chlorophenyl isocyanate | " | 3-(m-chlorophenyl)-6-methoxy-s-triazine-2,4(1H,3H)-dione, m.p. 183–185.5° |
| " | m-fluorophenyl isocyanate | " | 3-(m-fluorophenyl)-6-methoxy-s-triazine-2,4(1H,3H)-dione, m.p. 184–186° |
| " | sec-butyl isocyanate | " | 3-sec-butyl-6-methoxy-s-triazine-2,4(1H,3H)-dione, m.p. 121–122.5° |
| 2-ethylpseudourea | p-chlorophenyl isocyanate | " | 3-(p-chlorophenyl)-6-ethoxy-s-triazine-2,4(1H,3H)-dione, m.p. 241–242° |
| 2-methylpseudourea | p-nitrophenyl isocyanate | " | 3-(p-nitrophenyl)-6-methoxy-s-triazine-2,4(1H,3H)-dione, m.p. 290–292° |
| " | p-bromophenyl isocyanate | " | 3-(p-bromophenyl)-6-methoxy-s-triazine-2,4(1H,3H)-dione, m.p. 208–210° |
| " | 3,4-dichlorophenyl isocyanate | " | 3-(3,4-dichlorophenyl)-6-methoxy-s-triazine-2,4(1H,3H)-dione, m.p. 197–199° |
| 2-methyl-2-thiopseudourea | phenyl isothiocyanate | " | 3-phenyl-6-methylthio-2-thio-s-triazine-2,4(1H,3H)-dione, m.p. 235–238° |

-Continued

| Thiopseudourea or Pseudourea | Isocyanate or Isothiocyanate | Formates | s-Triazinediones |
|---|---|---|---|
| 2-methylpseudourea | p-methoxyphenyl isocyanate | " | 3-(p-methoxyphenyl)-6-methoxy-s-triazine-2,4(1H,3H)-dione, m.p. 213–214° |
| " | p-tolyl isocyanate | " | 3-(p-tolyl)-6-methoxy-s-triazine-2,4(1H,3H)-dione, m.p. 225–226° |
| " | benzyl isocyanate | " | 3-benzyl-6-methoxy-s-triazine-2,4(1H,3H)-dione, m.p. 169–170° |
| 2-hexyl-2-thiopseudourea | propyl isocyanate | " | 3-propyl-6-hexylthio-s-triazine-2,4(1H,3H)-dione |
| 2-cyclopropyl-2-thiopseudourea | cyclopropyl isocyanate | " | 3-cyclopropyl-6-cyclopropylthio-s-triazine-2,4(1H,3H)-dione |
| 2-cyclohexyl-2-thiopseudourea | cyclooctyl isocyanate | " | 3-cyclooctyl-6-cyclohexylthio-s-triazine-2,4(1H,3H)-dione |
| 2-allyl-2-thiopseudourea | cyclopropylmethyl isocyanate | " | 3-cyclopropylmethyl-6-allylthio-s-triazine-2,4(1H,3H)-dione |
| 2-(3-methylallyl)-3-thiopseudourea | cyclohexylmethyl isocyanate | methyl chlorothiolformate | 3-cyclohexylmethyl-6-(3-methylallylthio)-s-triazine-2,4(1H,3H)-dione |
| 2-propargyl-2-thiopseudourea | allyl isocyanate | methyl chloroformate | 3-allyl-6-propargylthio-s-triazine-2,4(1H,3H)-dione |
| 2-(3-methylpropargyl)-2-thiopseudourea | 3-methylallyl isocyanate | " | 3-(3-methylallyl)-6-(3-methylpropargyl-thio)-s-triazine-2,4(1H,3H)-dione |
| 2-benzyl-2-thiopseudourea | propargyl isocyanate | " | 3-propargyl-6-benzylthio-s-triazine-2,4(1H,3H)-dione |
| 2-methylpseudourea | 3-methylpropargyl isocyanate | " | 3-(3-methylpropargyl)-6-methoxy-s-triazine-2,4(1H,3H)-dione |
| 2-hexylpseudourea | benzyl isocyanate | " | 3-benzyl-6-hexyloxy-s-triazine-2,4(1H,3H)-dione |
| 2-methyl-2-thiopseudourea | p-iodophenyl isocyanate | methyl chlorodithioformate | 3-(p-iodophenyl)-6-methylthio-2-thio-s-triazine-2,4(1H,3H)-dione |
| 2-ethyl-2-thiopseudourea | m-tolyl isocyanate | " | 3-(m-tolyl)-6-(ethylthio)-2-thio-s-triazine-2,4(1H,3H)-dione |
| " | p-butylphenyl isocyanate | " | 3-(p-butylphenyl)-6-ethylthio-2-thio-s-triazine-2,4(1H,3H)-dione |
| " | p-nitrophenyl isocyanate | " | 3-(p-nitrophenyl)-6-ethylthio-2-thio-s-triazine-2,4(1H,3H)-dione |
| " | o-methoxyphenyl isocyanate | methyl chlorothiolformate | 3-(o-methoxyphenyl)-6-ethylthio-s-triazine-2,4(1H,3H)-dione |
| " | m-butoxyphenyl isocyanate | " | 3-(m-butoxyphenyl)-6-ethylthio-s-triazine-2,4(1H,3H)-dione |
| 2-methyl-2-thiopseudourea | p-methylthiophenyl isocyanate | " | 3-(p-methylthiophenyl)-6-methylthio-s-triazine-2,4(1H,3H)-dione |
| " | m-butylthiophenyl isocyanate | " | 3-(m-butylthiophenyl)-6-methylthio-s-triazine-2,4(1H,3H)-dione |
| " | p-cyanophenyl isocyanate | " | 3-(p-cyanophenyl)-6-methylthio-s-triazine-2,4(1H,3H)-dione |
| " | m-trifluoromethylphenyl isocyanate | " | 3-(m-trifluoromethylphenyl)-6-methylthio-s-triazine-2,4(1H,3H)-dione |
| " | 3,5-dichlorophenyl isocyanate | methyl chloroformate | 3-(3,5-dichlorophenyl)-6-methylthio-s-triazine-2,4(1H,3H)-dione |
| " | p-bromo-m-chlorophenyl isocyanate | " | 3-(p-bromo-m-chlorophenyl)-6-methylthio-s-triazine-2,4(1H,3H)-dione |
| " | 2-chloro-4-methylphenyl isocyanate | " | 3-(2-chloro-4-methylphenyl)-6-methylthio-s-triazine-2,4(1H,3H)-dione |
| " | o-fluorophenyl isocyanate | " | 3-(o-fluorophenyl)-6-methylthio-s-triazine-2,4(1H,3H)-dione |
| " | 2-methyl-4-chlorophenyl isocyanate | " | 3-2(-methyl-4-chlorophenyl)-6-methylthio-s-triazine-2,4(1H,3H)-dione |
| " | 2-ethylhexyl isocyanate | " | 3-(2-ethylhexyl)-6-methylthio-s-triazine-2,4(1H,3H)-dione |
| 2-ethylpseudourea | 2-chloro-5-methoxyphenyl isocyanate | " | 3-(2-chloro-5-methoxyphenyl)-6-ethoxy-s-triazine-2,4(1H,3H)-dione |
| " | 3-methyl-4-bromophenyl isocyanate | " | 3-(3-methyl-4-bromophenyl)-6-ethoxy-s-triazine-2,4(1H,3H)-dione |
| " | 2-bromo-4-nitrophenyl isocyanate | " | 3-(2-bromo-4-nitrophenyl)-6-ethoxy-s-triazine-2,4(1H,3H)-dione |
| " | 2-nitro-4-chlorophenyl isocyanate | " | 3-(2-nitro-4-chlorophenyl)-6-ethoxy-s-triazine-2,4(1H,3H)-dione |
| " | 2,4-dichlorophenyl isocyanate | " | 3-(2,4-dichlorophenyl)-6-ethoxy-s-triazine-2,4(1H,3H)-dione |
| 2-methylpseudourea | 2,4-dibromophenyl isocyanate | " | 3-(2,4-dibromophenyl)-6-methoxy-s-triazine-2,4(1H,3H)-dione |
| " | 2,5-dichloro-4-nitrophenyl isocyanate | " | 3-(2,5-dichloro-4-nitrophenyl)-6-methoxy-s-triazine-2,4(1H,3H)-dione |
| " | 3,4-diethoxyphenyl isocyanate | " | 3-(3,4-diethoxyphenyl)-6-methoxy-s-triazine-2,4(1H,3H)-dione |
| " | 2,4-difluorophenyl isocyanate | " | 3-(2,4-difluorophenyl)-6-methoxy-s-triazine-2,4(1H,3H)-dione |
| " | 2,5-dimethoxyphenyl isocyanate | " | 3-(2,5-dimethoxyphenyl)-6-methoxy-s-triazine-2,4(1H,3H)-dione |
| " | 3,5-dinitrophenyl isocyanate | " | 3-(3,5-dinitrophenyl)-6-methoxy-s-triazine-2,4(1H,3H)-dione |
| " | 2-fluoro-4,6-dinitrophenyl isocyanate | " | 3-(2-fluoro-4,6-dinitrophenyl)-6-methoxy-s-triazine-2,4(1H,3H)-dione |
| " | 3-nitro-4-fluorophenyl isocyanate | " | 3-(3-nitro-4-fluorophenyl)-6-methoxy-s-triazine-2,4(1H,3H)-dione |
| " | 2-methyl-4-methoxyphenyl isocyanate | " | 3-(2-methyl-4-methoxyphenyl)-6-methoxy-s-triazine-2,4(1H,3H)-dione |
| " | 2-methoxy-4-nitrophenyl isocyanate | " | 3-(2-methoxy-4-nitrophenyl)-6-methoxy-s-triazine-2,4(1H,3H)-dione |
| " | 2,4,5-trichlorophenyl isocyanate | " | 3-(2,4,5-trichlorophenyl)-6-methoxy-s-triazine-2,4(1H,3H)-dione |
| " | 2,4,6-trimethylphenyl isocyanate | " | 3-(2,4,6-trimethylphenyl)-6-methoxy-s-triazine-2,4(1H,3H)-dione |

EXAMPLE 10

3-Isopropyl-6-methylthio-s-triazine-2,4(1H,3H)-dione

To a solution of 138 parts of 2-methyl-2-thiopseudourea sulfate in 500 parts of water is added 80 parts 50% sodium hydroxide at 0°–10°C. One thousand parts of acetone are added, followed by a dropwise addition of 85 parts of isopropyl isocyanate at 0°C. The reaction mixture is allowed to warm to room temperature in 2 hours. The acetone is evaporated and the solid is filtered and dried to give 150 parts methyl 4-isopropyl-1-thioallophanimidate melting at 81°–85°C.

To a solution of 3.9 parts of phosgene in 100 parts of benzene is added dropwise 8.7 parts of the above compound in 50 parts of tetrahydrofuran. The reaction mixture is heated to reflux, cooled, and 16 parts of 50% sodium hydroxide in 100 parts of water added. After heating the solution to reflux, the benzene layer is discarded and the aqueous layer is neutralized with hydrochloric acid to give after filtration and drying 2 parts of 3-isopropyl-6-methylthio-s-triazine-2,4-(1H,3H)-dionee melting at 188°–190°C.

EXAMPLE 11

Sodium 3-isopropyl-6-methylthio-s-triazine-2,4-(1H,3H)-dione

To a solution of 1.6 parts of sodium methoxide in 20 parts of methanol is added 6.6 parts of 3-isopropyl-6-methylthio-s-triazine-2,4(1H,3H)-dione. The solution is evaporated under vacuum and the white solid is triturated with methylene chloride and filtered to give 5.5 parts of sodium 3-isopropyl-6-methylthio-s-triazine-2,4(1H,3H)-dione melting above 300°C.

Similarly, the following s-triazinedione salts can be prepared by using the appropriate starting materials.

| | |
|---|---|
| Lithium | 3-isopropyl-6-methylthio-s-triazine-2,4(1H,3H)-dione |
| Potassium | 3-isopropyl-6-methylthio-5-triazine-2,4(1H,3H)-dione |
| Calcium | bis-3-(tert-butyl)-6-methylthio-s-triazine-2,4(1H,3H)-dione |
| Magnesium | bis-3-(tert-butyl)-6-methylthio-s-triazine-2,4(1H,3H)-dione |
| Barium | bis-3-(tert-butyl)-6-methylthio-s-triazine-2,4(1H,3H)-dione |
| Sodium | 3-(m-trifluoromethylphenyl)-6-methylthio-s-triazine-2,4(1H,3H)-dione |
| Sodium | 3-cyclooctyl-6-methylthio-s-triazine-2,4(1H,3H)-dione, >300°C. |
| Sodium | 3-(m-fluorophenyl)-6-methylthio-s-triazine-2,4(1H,3H)-dione, >300°C. |
| Sodium | 3-(2-methyl-5-chlorophenyl)-6-methylthio-s-triazine-2,4(1H,3H)-dione, >300°C. |
| Sodium | 3-(3-chloro-4-methylphenyl)-6-methylthio-s-triazine-2,4(1H,3H)-dione, >300°C. |
| Sodium | 3-(2,6-dichlorophenyl)-6-methylthio-s-triazine-2,4(1H,3H)-dione, >300°C. |
| Sodium | 3-(p-tolyl)-6-methylthio-s-triazine-2,4(1H,3H)-dione, >300°C. |
| Sodium | 3-cycloheptyl-6-methylthio-s-triazine-2,4(1H,3H)-dione, >300°C. |

EXAMPLE 12

Ammonium 3-(p-chlorophenyl)-6-methoxy-s-triazine-2,4-(1H,3H)-dione

To a mixture of 10 aprts of 3-(p-chlorophenyl)-6-methoxy-s-triazine-2,4-(1H,3H)-dione and 100 parts of methanol is added 1 part of ammonia gas at 20°C. The solution is stirred for 30 minutes and then evaporated under vacuum to give 10.6 parts of ammonium 3-(p-chlorophenyl)-6-methoxy-s-triazine-2,4(1H,3H)-dione.

Similarly, the following s-triazinedione amine salts can be prepared by using the appropriate starting materials.

| | |
|---|---|
| methylammonium | 3-(p-chlorophenyl)-6-methoxy-s-triazine-2,4(1H,3H)-dione |
| tri-(2-hydroxyethyl)ammonium | " |
| " | 3-isopropyl-6-ethoxy-s-triazine-2,4(1H,3H)-dione |
| dimethylammonium | " |
| ethylammonium | " |
| morpholinium | " |
| piperidinium | " |
| butylammonium | 3-(p-chlorophenyl)-6-methylthio-s-triazine-2,4(1H,3H)-dione |
| di-sec-butylammonium | " |
| diethylammonium | " |
| propylammonium | " |
| hexahydroazepidinium | 3-isopropyl-6-methoxy-s-triazine-2,4(1H,3H)-dione |
| pyrrolidinium | " |
| tetraethylammonium | " |
| trimethylammonium | 3-(2-methyl-4-chlorophenyl)-6-methoxy-s-triazine-2,4(1H,3H)-dione |
| tetramethylammonium | " |
| dodecyltrimethylammonium | " |
| 2-hydroxyethylammonium | " |
| benzylammonium | " |
| benzyltrimethylammonium | " |
| triethylammonium | |

EXAMPLE 13

1-Acetyl-3-isopropyl-6-methylthio-s-triazine-2,4(1H,3H)-dione

To 9.0 parts sodium 3-isopropyl-6-methylthio-s-triazine-2,4(1H,3H)-dione prepared as in Example 10 in 100 parts tetrahydrofuran can be added 3.1 parts acetyl chloride. The reaction can be refluxed for 5 hours and the solvent evaporated. Methylene chloride can be added to the residue and the solution can be washed with 1N sodium hydroxide and brine. After drying and evaporation of the solvent, the residue can be recrystallized from chlorobutane.

Similarly, the following s-triazinediones can be prepared by using appropriate starting materials.

| Starting s-triazinedione | Halide | Product |
|---|---|---|
| 3-isopropyl-6-methylthio-s-triazine-2,4(1H,3H)-dione | butyryl chloride | 1-butyryl-3-isopropyl-6-methylthio-s-triazine-2,4(1H,3H)-dione |
| 3-isopropyl-6-ethoxy-s-triazine-2,4(1H,3H)-dione | methyl chloroformate | 1-methoxycarboyl-3-isopropyl-6-ethoxy-s-triazine-2,4(1H,3H)-dione |
| 3-(p-chlorophenyl)-6-methoxy-s-triazine-2,4(1H,3H)-dione | methyl chlorothiolformate | 1-methylthiolcarbonyl-3-(p-chlorophenyl)-6-methoxy-s-triazine-2,4(1H,3H)-dione |
| " | n-butyl chloroformate | 1-butylcarbonyl-3-(p-chlorophenyl)-6-methoxy-s-triazine-2,4(1H,3H)-dione |
| 3-(2-methyl-4-chlorophenyl)-6-methylthio-s-triazine-2,4(1H,3H)-dione | n-butyl chlorothiolformate | 1-butylthiocarbonyl-3-(2-methyl-4-chlorophenyl)-6-methylthio-s-triazine-2,4(1H,3H)-dione |

EXAMPLE 14

3-Isopropyl-6-methoxy-s-triazine-2,4(1H,3H)-dione

A solution of 23 parts of methyl N-(1-amino-1-methoxymethylene)-carbamate, 16 parts of isopropyl isocyanate 60 parts of methylene chloride, and a catalytic amount of dimethylformamide and triethylamine is allowed to stand at room temperature for 3 days. The solvent is evaporated to afford 33 parts of crude methyl 4-isopropyl-N-methoxycarbonyl-allophanimidate, an oil, $N_D^{25}$ 1.4823.

A solution of 9 parts of the above compound, 10 parts of sodium methoxide, and 100 parts of methanol is refluxed for 1 hr. The solvent is removed under vacuum. Water is then added to the residue. After extraction with methylene chloride, the aqueous layer is neutralized at 5°–10°C. Filtration affords 3 parts of crude solid, which is recrystallized from acetonitrile to give 2 parts of 3-isopropyl-4-methoxy-s-triazine-2,4(1H,3H)-dione, m.p. 195–200°C.

EXAMPLE 15

3-Isopropyl-6-ethoxy-s-triazine-2,4(1H,3H)-dione

To 114 parts of 2-methylpseudourea sulfate in 400 parts of water at 0°C is added 106 parts of 50% sodium hydroxide, followed by 400 parts of acetone, and 51 parts of isopropyl isocyanate. The reaction mixture is allowed to come to room temperature in 3 hrs. The organic solvent is then evaporated under vacuum, the aqueous residue saturated with sodium chloride, and the mixture extracted with methylene chloride. The organic extract is dried and the methylene chloride evaporated to yield 78 parts of methyl 4-isopropylallophanimidate, m.p. 64°–67°C.

To a solution of 32 parts of the above compound and 24 parts of triethylamine at 0°C is added 27 parts of ethyl chlorothiolformate. The reaction mixture is stirred at room temperature overnight. Water is added and the methylene chloride layer is separated and dried. The methylene chloride is then evaporated to yield 64 parts of crude methyl 4-isopropyl-N-ethylthiolcarbonylallophanimidate, an oil.

A solution of 64 parts of the above compound, 40 parts of sodium methoxide, and 500 parts of ethanol is refluxed for 1 hour. Ethanol is then removed under vacuum and water is added to the residue. After extraction with methylene chloride, the aqueous layer is neutralized at 5°–10°C. with concentrated hydrochloric acid to yield after filtration 8 parts of a solid, which is recrystallized from a mixture of carbontetrachloride/acetonitrile to give 2 parts of 3-isopropyl-6-ethoxy-s-triazine-2,4-(1H,3H)-dione, m.p. 170°–171°C. The methoxy group in the starting material is replaced by an ethoxy group during the reaction in the ethanol solvent.

EXAMPLE 16

1-Methyl-3(p-chlorophenyl)-6-methoxy-s-triazine-2,4-(1H,3H)-dione

To 70 parts of sodium 3-(p-chlorophenyl)-6-methoxy-s-triazine-2,4(1H,3H)-dione in 250 parts of dimethylformamide is added 54 parts of methyl p-toluenesulfonate. The mixture is stirred overnight at room temperature, and the solvent is evaporated under vacuum. The residue is triturated with a 1% sodium carbonate solution, and the resulting solid is recrystallized from acetonitrile to give 30 parts of pure 1-methyl-3-(p-chlorophenyl)-6-methoxy-s-triazine-2,4(1H,3H)-dione melting at 185°–187°C.

EXAMPLE 17

1-Methyl-3-isopropyl-6-methylthio-s-triazine-2,4(1H,3H)-dione

A mixture of 100 parts of sodium 3-isopropyl-6-methylthio-s-triazine-2,4(1H,3H)-dione and 65 parts of methyl iodide are refluxed overnight. The solvent is evaporated under vacuum and the residue is washed with water. Recrystallization from 1-chlorobutane affords 45 parts of 1-methyl-3-isopropyl-6-methylthio-s-triazine-2,4(1H,3H)-dione, melting at 74°–77°C.

EXAMPLE 18

1-Methyl-3-tert-butyl-6-methoxy-s-triazine-2,4(1H,3H)-dione

To 50 parts of 2-methylpseudourea hydrogen sulfate in a mixture of 300 parts of water and 300 parts of methylene chloride is added 48 parts of 50% sodium hydroxide, followed by 35 parts of tert-butyl isocyanate. The mixture is stirred vigorously for 4 hours. The methylene chloride layer is dried over anhydrous sodium sulfate and evaporated under vacuum. The resulting oil is triturated in hexane to afford 45 parts of methyl 4-tert-butylallophanimidate melting at 72°–74°C.

A mixture of 161 parts of the above compound and 105 parts of triethylamine in 500 parts of methylene chloride is added dropwise to a solution of 100 parts of phosgene in 2000 parts of methylene chloride at —20°C. The mixture is warmed to 0°C., and 210 parts of triethylamine is added slowly. The reaction mixture is then refluxed overnight. Extraction of the mixture is carried out with an aqueous solutiono containing 124 parts of sodium hydroxide. The aqueous layer is evaporated under vacuum to give a mixture of sodium chloride and sodium 3-tert-butyl-6-methoxy-s-triazine-2,4(1H,3H)-dione. To this mixture is added 20 parts of dimethylformamide and 19 parts of methyl p-toluenesulfonate. After stirring overnight at room temperature the solvent is removed under vacuum and the residue is treated with dilute sodium hydroxide. Extraction with methylene chloride, drying the organic layer over anhydrous sodium sulfate and evaporating the solvent under vacuum affords 10 parts of 1-methyl-3-tert-butyl-6-methoxy-s-triazine-2,4(1H,3H)-dione as an oil.

EXAMPLE 19

1-Methyl-3-tert-butyl-6-methylthio-s-triazine-2,4(1H,3H)-dione

To a solution of 278 parts of 2-methyl-2-thiopseudourea sulfate in 2000 parts of 50% aqueous methanol at 0°C is added dropwise 176 parts of 50% sodium hydroxide, followed by 180 parts tert-butyl isocyanate in 400 parts tetrahydrofuran. The solution is partially evaporated on a rotary evaporator and filtered to yield, after drying, 180 parts of methyl 4-tert-butyl-1-thioallophanimidate, m.p. 102°–104°C.

To a solution of 113.4 parts of the above compound and 80 parts of triethylamine in 1000 parts methylene chloride at 0°C is added dropwise 66 parts methyl chlorothiolformate in 100 parts of methylene chloride. The solution is stirred overnight, washed once with water, dried and evaporated to provide 76 parts methyl 4-tert-butyl-N-methiolcarbonyl-1-thioallophanimidate, m.p. 102°–105°C.

Fifty parts of the above compound is refluxed for one hour with 30 parts of sodium methoxide in 500 parts of methanol. The reaction mixture is then cooled and the methanol is stripped on a rotary evaporator. The residue is washed with ether to provide 30 parts sodium 3-tert-butyl-6-methylthio-s-triazine-2,4(1H,3H)-dione.

Twenty-four parts of sodium 3-tert-butyl-6-methylthio-s-triazine-2,4(1H,3H)-dione and 15.5 parts of methyl iodide are refluxed overnight in 200 parts of acetonitrile. The solvent is evaporated and the residue dissolved in methylene chloride. The methylene chloride solution is washed with water, dried, and evaporated to afford after recrystallization from chlorobutane 15 parts of 1-methyl-3-tert-butyl-6-methylthio-s-triazine-2,4(1H,3H)-dione, m.p. 138°–140°C.

EXAMPLE 20

1-Methyl-3-phenyl-6-methylthio-s-triazine-2,4(1H,3H)-dione

Twenty-six parts of sodium 3-phenyl-6-methylthio-s-triazine-2,4(1H,3H)-dione (prepared in a manner similar to that described in Example 1 for preparation of sodium 3-isopropyl-6-methylthio-2-triazine-2,4(1H,3H)-dione, except substituting phenyl isocyanate for the isopropyl isocyanate) and 16 parts of methyl iodide are refluxed in 200 parts of acetonitrile. The solvent is evaporated and the residue dissolved in methylene chloride. The methylene chloride solution is washed with water, dried, and evaporated to afford 18 parts of 1-methyl-3-phenyl-6-methylthio-s-triazine-2,4-(1H,3H)-dione, m.p. 232.5°–233°C.

EXAMPLE 21

1-Methyl-3-cyclohexyl-6-methylthio-s-triazine-2,4-(1H,3H)-dione

To 84 parts of methyl N-(1-amino-1-methylthiomethylene)-carbamate in 500 parts of methylene chloride is added 71 parts of cyclohexyl isocyanate and a catalytic amount of dibutyltin dilaurate. The solution is refluxed for 3 hours and cooled. To it is added 31 parts of sodium methoxide in 300 parts of methanol. The solution is refluxed for one hour and the solvent evaporated on a rotary evaporator. The residue is triturated with ether to give 71 parts of sodium 3-cyclohexyl-6-methylthio-s-triazine-2,4(1H,3H)-dione, m.p. above 300°C.

A suspension of 26 parts of the above compound in 200 parts of acetonitrile containing 16 parts of methyl iodide is refluxed overnight. The solvent is evaporated on a rotary evaporator. Water and methylene chloride are added to the residue. The methylene chloride layer is dried and evaporated on a rotary evaporator to give after trituration with pentane 19 parts of 1-methyl-3-cyclohexyl-6-methylthio-s-triazine-2,4(1H,3H)-dione, m.p. 135°–137°C.

The product is also prepared by using dimethyl sulfate as the alkylating agent. To 439 parts of 3-cyclohexyl-6-methylthio-s-triazine-2,4(1H,3H)-dione sodium salt in 2500 parts of water at 25°C and pH 9-9.5 is added dropwise over one hour 284 parts of dimethyl sulfate. The solid formed is filtered and dried to give 324 parts of crude 1-methyl-3-cyclohexyl-6-methylthio-s-triazine-2,4(1H,3H)-dione, m.p. 134°–138°C.

EXAMPLE 22

1-Methyl-3-cyclopentyl-6-methylthio-s-triazine-2,4(1H,3H)-dione

Fifty parts of sodium 3-cyclopentyl-6-methylthio-s-triazine-2,4(1H,3H)-dione (prepared in a manner similar to that described in Example 1 for preparation of sodium 3-isopropyl-6-methylthio-s-triazine-2,4(1H,3H)-dione, but substituting cyclopentyl isocyanate for the iropropyl isocyanate) and 31 parts of methyl iodide are refluxed in 400 parts of acetonitrile. The solvent is evaporated and the residue is dissolved in methylene chloride. The methylene chloride solution is washed with water, dried, evaporated, and the residue is recrystallized in a chlorobutane/hexane mixture to afford 24 parts of 1-methyl-3-cyclopentyl-6-methylthio-s-triazine-2,4(1H,3H)-dione, m.p. 80°–83°C.

EXAMPLE 23

The s-triazinediones listed in the following table can be prepared by the procedures of Examples 3-8 by substituting the listed 2-substituted thiopseudoureas and pseudoureas for 2-methylpseudourea and 2-methyl-2-thiopseudourea, by employing other isocyanates and by replacing the methyl p-toluenesulfonate and methyl iodide with the listed alkylating agents:

| Thiopseudourea or Pseudourea | Isocyanate | Alkylating Agent | s-Triazinediones |
|---|---|---|---|
| 2-ethylpseudourea | isopropyl isocyanate | methyl p-toluenesulfonate | 1-methyl-3-isopropyl-6-ethoxy-s-triazine-2,4(1H,3H)-dione $N_D^{25} = 1.4900$ |
| 2-methylpseudourea | m-fluorophenyl isocyanate | " | 1-methyl-3-(m-fluorophenyl)-6-methoxy-s-triazine-2,4(1H,3H)-dione, m.p. 156–158°C |
| " | m-chlorophenyl isocyanate | " | 1-methyl-3(m-chlorophenyl)-6-methoxy-s-triazine-2,4(1H,3H)-dione, m.p. 186–188°C |
| 2-ethylpseudourea | cyclohexyl isocyanate | " | 1-methyl-3-cyclohexyl-6-ethoxy-s-triazine-2,4(1H,3H)-dione, $N_D^{25} = 1.5610$ |
| 2-methyl-2-thiopseudourea | sec-butyl isocyanate | methyl iodide | 1-methyl-3-sec-butyl-6-methylthio-s-triazine-2,4(1H,3H)-dione, $N_D^{25} = 1.5382$ |
| " | 1-methylcyclopentyl isocyanate | " | 1-methyl-3-(1-methylcyclopentyl)-6-methylthio-s-triazine-2,4(1H,3H)-dione, m.p. 84–86°C |
| " | cycloheptyl isocyanate | " | 1-methyl-3-cycloheptyl-6-methylthio-s-triazine-2,4(1H,3H)-dione, m.p. 98–101°C |
| " | 2-methylcyclohexyl isocyanate | " | 1-methyl-3-(2-methylcyclohexyl)-6-methylthio-s-triazine-2,4(1H,3H)-dione, m.p. 98–100°C |
| " | 2,4,6-trimethylcyclohexyl isocyanate | " | 1-methyl-3-(2,4,6-trimethylcyclohexyl)-6-methylthio-s-triazine-2,4(1H,3H)-dione |
| " | 3,5-dimethylcyclohexyl isocyanate | " | 1-methyl-3-(3,5-dimethylcyclohexyl)-6-methylthio-s-triazine-2,4(1H,3H)-dione, $N_D^{25} = 1.540$ |
| " | 2,3,5,6-tetramethylcyclohexyl isocyanate | " | 1-methyl-3-(2,3,5,6-tetramethylcyclohexyl)-6-methylthio-s-triazine-2,4(1H,3H)-dione |
| " | 3,4-dimethylcyclohexyl isocyanate | " | 1-methyl-3-(3,4-dimethylcyclohexyl)-6-methylthio-s-triazine-2,4(1H,3H)-dione, m.p. 85–87° |
| " | 2,5-dimethylcyclohexyl isocyanate | " | 1-methyl-3-(2,5-dimethylcyclohexyl)-6-methylthio-s-triazine-2,4-(1H,3H)-dione, $N_D^{25} = 1.5382$ |
| " | cyclooctyl isocyanate | " | 1-methyl-3-cyclooctyl-6-methylthio-s-triazine-2,4(1H,3H)-dione, m.p. 93–94.5°C |
| " | 3-methylcyclohexyl isocyanate | " | 1-methyl-3-(3-methylcyclohexyl)-6-methylthio-s-triazine-2,4(1H,3H)-dione, m.p. 95–97°C |
| " | neopentyl isocyanate | " | 1-methyl-4-neopentyl-6-methylthio-s-triazine-2,4(1H,3H)- |

3,901,682

| Thiopseudourea or Pseudourea | Isocyanate | Alkylating Agent | s-Triazinediones |
|---|---|---|---|
| | | | dione, m.p. 99–103°C. |
| " | isopropyl isocyanate | n-butyl iodide | 1-butyl-3-isopropyl-6-methylthio-s-triazine-2,4(1H,3H)-dione, $N_D^{25}$ = 1.5143 |
| " | p-chlorophenyl isocyanate | n-propyl iodide | 1-propyl-3-(p-chlorophenyl)-6-methylthio-s-triazine-2,4(1H,3H)-dione, m.p. 148–150°C |
| " | isopropyl isocyanate | " | 1-propyl-3-isopropyl-6-methylthio-s-triazine-2,4(1H,3H)-dione, m.p. 92–96°C |
| " | " | methyl iodide | 1-methyl-3-isopropyl-6-methylthio-s-triazine-2,4(1H,3H)-dione, $N_D^{25}$ = 1.5257 |
| " | m-trifluoromethylphenyl isocyanate | " | 1-methyl-3-(m-trifluoromethylphenyl)-6-methylthio-s-triazine-2,4(1H,3H)-dione, m.p. 70.5–73°C |
| " | m-nitrophenyl isocyanate | " | 1-methyl-3-(m-nitrophenyl)-6-methylthio-s-triazine-2,4(1H,3H)-dione, m.p. 239–240°C |
| " | benzyl isocyanate | " | 1-methyl-3-benzyl-6-methylthio-s-triazine-2,4(1H,3H)-dione, m.p. 138–141°C |
| " | butyl isocyanate | " | 1-methyl-3-butyl-6-methylthio-s-triazine-2,4(1H,3H)-dione, m.p. 78–79°C |
| " | 2,5-dichlorophenyl isocyanate | " | 1-methyl-3-(2,5-dichlorophenyl)-6-methylthio-s-triazine-2,4(1H,3H)-dione, m.p. 255–258°C. |
| " | cyclopropyl isocyanate | " | 1-methyl-3-cyclopropyl-6-methylthio-s-triazine-2,4(1H,3H)-dione, m.p. 146–150°C. |
| " | 2,6-dimethylphenyl isocyanate | " | 1-methyl-3-(2,6-dimethylphenyl)-6-methylthio-s-triazine-2,4(1H,3H)-dione, m.p. 178–181°C. |
| " | 2-methyl-5-chlorophenyl isocyanate | " | 1-methyl-3-(2-methyl-5-chlorophenyl)-6-methylthio-s-triazine-2,4(1H,3H)-dione, m.p. 203.5–206°C |
| " | 3-chloro-4-methylphenyl isocyanate | " | 1-methyl-3-(3-chloro-4-methylphenyl)-6-methylthio-s-triazine-2,4(1H,3H)-dione, m.p. 228–230°C |
| " | phenyl isocyanate | " | 1-methyl-3-phenyl-6-methylthio-s-triazine-2,4(1H,3H)-dione, m.p. 232.5–233°C. |
| " | cyclohexyl isocyanate | ethyl iodide | 1-ethyl-3-cyclohexyl-6-methylthio-s-triazine-2,4(1H,3H)-dione, $N_D^{25}$ = 1.5424 |
| " | o-fluorophenyl isocyanate | methyl iodide | 1-methyl-3-(o-fluorophenyl)-6-methylthio-s-triazine-2,4(1H,3H)-dione, m.p. 129–132°C. |
| " | o-nitrophenyl isocyanate | " | 1-methyl-3-(o-nitrophenyl)-6-methylthio-s-triazine-2,4(1H,3H)-dione |
| " | propyl isocyanate | " | 1-methyl-3-propyl-6-methylthio-s-triazine-2,4(1H,3H)-dione, m.p. 189–191°C. |
| " | m-tolyl isocyanate | " | 1-methyl-3-(m-tolyl)-6-methylthio-s-triazine-2,4(1H,3H)-dione, m.p. 192.5–195.5°C. |
| " | allyl isocyanate | " | 1-methyl-3-allyl-6-methylthio-s-triazine-2,4(1H,3H)-dione, m.p. 132–133.5°C. |
| " | 3,4-dichlorophenyl isocyanate | methyl iodide | 1-methyl-3-(3,4-dichlorophenyl)-6-methylthio-s-triazine-2,4(1H,3H)-dione, m.p. 204.5–207°C |
| " | p-fluorophenyl isocyanate | isopropyl iodide | 1-isopropyl-3-(p-fluorophenyl)-6-methylthio-s-triazine-2,4(1H,3H)-dione |
| " | p-nitrophenyl isocyanate | isobutyl iodide | 1-isobutyl-3-(p-nitrophenyl)-6-methylthio-s-triazine-2,4(1H,3H)-dione |
| " | p-bromophenyl isocyanate | 2-iodobutane | 1-sec-butyl-3-(p-bromophenyl)-6-methylthio-s-triazine-2,4(1H,3H)-dione |
| " | o-chlorophenyl isocyanate | methyl iodide | 1-methyl-3-(o-chlorophenyl)-6-methylthio-s-triazine-2,4(1H,3H)-dione, m.p. 152–154.5°C |
| " | m-chlorophenyl isocyanate | " | 1-methyl-3-(m-chlorophenyl)-6-methylthio-s-triazine-2,4(1H,3H)-dione, m.p. 297–297.5°C |
| " | cyclohexylmethyl isocyanate | " | 1-methyl-3-cyclohexylmethyl-6-methylthio-s-triazine-2,4(1H,3H)-dione, m.p. 102.5–104°C |
| 2-allyl-2-thiopseudourea | isopropyl isocyanate | " | 1-methyl-3-isopropyl-6-allylthio-s-triazine-2,4(1H,3H)-dione |
| 2-methylpseudourea | octyl isocyanate | methyl p-toluene sulfonate | 1-methyl-3-octyl-6-methoxy-s-triazine-2,4(1H,3H)-dione |
| " | cyclohexyl isocyanate | " | 1-methyl-3-cyclohexyl-6-methoxy-s-triazine-2,4(1H,3H)-dione |
| " | p-fluorophenyl isocyanate | " | 1-methyl-3-(p-fluorophenyl)-6-methoxy-s-triazine-2,4(1H,3H)-dione |
| " | sec-butyl isocyanate | " | 1-methyl-3-sec-butyl-6-methoxy-s-triazine-2,4(1H,3H)-dione |
| " | p-chlorophenyl isocyanate | isopropyl p-toluenesulfonate | 1-isopropyl-3-(p-chlorophenyl)-6-methoxy-s-triazine-2,4(1H,3H)-dione |
| 2-ethylpseudourea | " | methyl p-toluenesulfonate | 1-methyl-3-(p-chlorophenyl)-6-ethoxy-s-triazine-2,4(1H,3H)-dione |
| 2-methylpseudourea | p-nitrophenyl isocyanate | " | 1-methyl-3-(p-nitrophenyl)-6-methoxy-s-triazine-2,4(1H,3H)-dione |
| " | p-bromophenyl isocyanate | " | 1-methyl-3-(p-bromophenyl)-6-methoxy-s-triazine-2,4(1H,3H)-dione |
| " | 3,4-dichlorophenyl isocyanate | " | 1-methyl-3-(3,4-dichlorophenyl)-6-methoxy-s-triazine-2,4(1H,3H)-dione |
| " | p-methoxyphenyl isocyanate | " | 1-methyl-3-(p-methoxyphenyl)-6-methoxy-s-triazine-2,4(1H,3H)-dione |
| " | p-tolyl isocyanate | " | 1-methyl-3-(p-tolyl)-6-methoxy-s-triazine-2,4(1H,3H)-dione |
| " | benzyl isocyanate | " | 1-methyl-3-benzyl-6-methoxy-s-triazine-2,4(1H,3H)-dione |
| " | 2,4-dichlorophenyl isocyanate | " | 1-methyl-3-(2,4-dichlorophenyl)-6-methoxy-s-triazine-2,4(1H,3H)-dione, m.p. 165–166°C. |
| 2-hexyl-2-thiopseudourea | propyl isocyanate | methyl iodide | 1-methyl-3-propyl-6-hexylthio-s-triazine-2,4(1H,3H)-dione |
| 2-cyclopropyl-2-thiopseudourea | cyclopropyl isocyanate | " | 1-methyl-3-cyclopropyl-6-cyclopropyl-thio-s-triazine-2,4(1H,3H)-dione |
| 2-cyclohexyl-2-thiopseudourea | cyclooctyl isocyanate | " | 1-methyl-3-cyclooctyl-6-cyclohexylthio-s-triazine-2,4(1H,3H)-dione |
| 2-allyl-2-thiopseudourea | cyclopropylmethyl isocyanate | " | 1-methyl-3-cyclopropylmethyl-6-allylthio-s-triazine-2,4(1H,3H)-dione |
| 2-(2-butenyl)-2-thiopseudourea | cyclohexylmethyl isocyanate | " | 1-methyl-3-cyclohexylmethyl-6-(2-butenylthio)-s-triazine-2,4(1H,3H)-dione |
| 2-propargyl-2-thiopseudourea | allyl isocyanate | " | 1-methyl-3-allyl-6-propargylthio-s-triazine-2,4(1H,3H)-dione |
| 2-(2-butynyl)-2-thiopseudourea | 2-butenyl isocyanate | " | 1-methyl-3-(2-butenyl)-6-(2-butynylthio)-s-triazine-2,4(1H,3H)-dione |
| 2-benzyl-2-thiopseudourea | propargyl isocyanate | " | 1-methyl-3-propargyl-6-benzylthio-s-triazine-2,4(1H,3H)-dione |
| 2-methylpseudourea | 2-butynyl isocyanate | methyl p-toluenesulfonate | 1-methyl-3-(2-butynyl)-6-methoxy-s-triazine-2,4(1H,3H)-dione |

—Continued

| Thiopseudourea or Pseudourea | Isocyanate | Alkylating Agent | s-Triazinediones |
|---|---|---|---|
| 2-hexylpseudourea | benzyl isocyanate | '' | 1-methyl-3-benzyl-6-hexyloxy-s-triazine-2,4(1H,3H)-dione |
| 2-methyl-2-thiopseudourea | p-iodophenyl isocyanate | methyl iodide | 1-methyl-3-(p-iodophenyl)-6-methylthio-s-triazine-2,4(1H,3H)-dione |
| 2-ethyl-2-thiopseudourea | m-tolyl isocyanate | '' | 1-methyl-3-(m-tolyl)-6-ethylthio-s-triazine-2,4(1H,3H)-dione |
| '' | p-butylphenyl isocyanate | '' | 1-methyl-3-(p-butylphenyl)-6-ethylthio-s-triazine-2,4(1H,3H)-dione |
| '' | p-nitrophenyl isocyanate | '' | 1-methyl-3-(p-nitrophenyl)-6-ethylthio-s-triazine-2,4(1H,3H)-dione |
| '' | o-methoxyphenyl isocyanate | '' | 1-methyl-3-(o-methoxyphenyl)-6-ethylthio-s-triazine-2,4(1H,3H)-dione |
| '' | m-butoxyphenyl isocyanate | '' | 1-methyl-3-(m-butoxyphenyl)-6-ethylthio-s-triazine-2,4(1H,3H)-dione |
| '' | cyclopentyl isocyanate | '' | 1-methyl-3-cyclopentyl-6-ethylthio-s-triazine-2,4(1H,3H)-dione, m.p. 49–51°C |
| 2-methyl-2-thiopseudourea | p-methylthiophenyl isocyanate | '' | 1-methyl-3-(p-methylthiophenyl)-6-methylthio-s-triazine-2,4(1H,3H)-dione |
| '' | m-butylthiophenyl isocyanate | '' | 1-methyl-3-(m-butylthiophenyl)-6-methylthio-s-triazine-2,4(1H,3H)-dione |
| '' | p-cyanophenyl isocyanate | '' | 1-methyl-3-(p-cyanophenyl)-6-methylthio-s-triazine-2,4(1H,3H)-dione |
| '' | m-trifluoromethylphenyl isocyanate | '' | 1-methyl-3-(m-trifluoromethylphenyl)-6-methylthio-s-triazine-2,4(1H,3H)-dione, m.p. 70.5–73°C |
| '' | 3,5-dichlorphenyl isocyanate | '' | 1-methyl-3-(3,5-dichlorophenyl)-6-methylthio-s-triazine-2,4(1H,3H)-dione |
| '' | p-bromo-m-chlorophenyl isocyanate | '' | 1-methyl-3-(p-bromo-m-chlorophenyl)-6-methylthio-s-triazine-2,4(1H,3H)-dione |
| '' | 2-chloro-4-methylphenyl isocyanate | methyl iodide | 1-methyl-3-(2-chloro-4-methylphenyl)-6-methylthio-s-triazine-2,4(1H,3H)-dione |
| '' | 2-methyl-4-chlorophenyl isocyanate | '' | 1-methyl-3-(2-methyl-4-chlorophenyl)-6-methylthio-s-triazine-2,4(1H,3H)-dione, m.p. 165–167°C. |
| '' | 2-ethylhexyl isocyanate | '' | 1-methyl-3-(2-ethylhexyl)-6-methylthio-s-triazine-2,4(1H,3H)-dione |
| 2-ethylpseudourea | 2-chloro-5-methoxyphenyl isocyanate | methyl p-toluenesulfonate | 1-methyl-3-(2-chloro-5-methoxyphenyl)-6-ethoxy-s-triazine-2,4(1H,3H)-dione |
| '' | 3-methyl-4-bromophenyl isocyanate | '' | 1-methyl-3-(3-methyl-4-bromophenyl)-6-ethoxy-s-triazine-2,4(1H,3H)-dione |
| '' | 2-bromo-4-nitrophenyl isocyanate | '' | 1-methyl-3-(2-bromo-4-nitrophenyl)-6-ethoxy-s-triazine-2,4(1H,3H)-dione |
| '' | 2-nitro-4-chlorophenyl isocyanate | '' | 1-methyl-3-(2-nitro-4-chlorophenyl)-6-ethoxy-s-triazine-2,4(1H,3H)-dione |
| '' | 2,4-dichlorophenyl isocyanate | '' | 1-methyl-3-(2,4-dichlorophenyl)-6-ethoxy-s-triazine-2,4(1H,3H)-dione |
| 2-methylpseudourea | 2,4-dibromophenyl isocyanate | '' | 1-methyl-3-(2,4-dibromophenyl)-6-methoxy-s-triazine-2,4(1H,3H)-dione |
| '' | 2,5-dichloro-4-nitrophenyl isocyanate | '' | 1-methyl-3-(2,5-dichloro-4-nitrophenyl)-6-methoxy-s-triazine-2,4(1H,3H)-dione |
| '' | 3,4-diethoxyphenyl isocyanate | '' | 1-methyl-3-(3,4-diethoxyphenyl)-6-methoxy-s-triazine-2,4(1H,3H)-dione |
| '' | 2,4-difluorophenyl isocyanate | '' | 1-methyl-3-(2,4-difluorophenyl)-6-methoxy-s-triazine-2,4(1H,3H)-dione |
| '' | 2,5-dimethoxyphenyl isocyanate | '' | 1-methyl-3-(2,5-dimethoxyphenyl)-6-methoxy-s-triazine-2,4(1H,3H)-dione |
| '' | 3,5-dinitrophenyl isocyanate | '' | 1-methyl-3-(3,5-dinitrophenyl)-6-methoxy-s-triazine-2,4(1H,3H)-dione |
| '' | 2-fluoro-4,6-dinitrophenyl isocyanate | '' | 1-methyl-3-(2-fluoro-4,6-dinitrophenyl)-6-methoxy-s-triazine-2,4(1H,3H)-dione |
| '' | 3-nitro-4-fluorophenyl isocyanate | '' | 1-methyl--3-(3-nitro-4-fluorophenyl)-6-methoxy-s-triazine-2,4(1H,3H)-dione |
| '' | 2-methyl-4-methoxyphenyl isocyanate | '' | 1-methyl-3-(2-methyl-4-methoxyphenyl)-6-methoxy-s-triazine-2,4(1H,3H)-dione |
| '' | 2-methoxy-4-nitrophenyl isocyanate | '' | 1-methyl-3-(2-methoxy-4-nitrophenyl)-6-methoxy-s-triazine-2,4(1H,3H)-dione |
| '' | 2,4,5-trichlorophenyl isocyanate | '' | 1-methyl-3-(2,4,5-trichlorophenyl)-6-methoxy-s-triazine-2,4(1H,3H)-dione |
| '' | 2,4,6-trimethylphenyl isocyanate | '' | 1-methyl-3-(2,4,6-trimethylphenyl)-6-methoxy-s-triazine-2,4(1H,3H)-dione |
| '' | o-chlorophenyl isocyanate | '' | 1-methyl-3-(o-chlorophenyl)-6-methoxy-s-triazine-2,4(1H,3H)-dione |
| '' | 2,4-dichlorophenyl isocyanate | '' | 1-methyl-3-(2,4-dichlorophenyl)-6-methoxy-s-triazine-2,4(1H,3H)-dione |
| '' | o-tolyl isocyanate | '' | 1-methyl-3-(o-tolyl)16-methoxy-s-triazine-2,4(1H,3H)-dione |
| '' | 2,5-dibutoxyphenyl isocyanate | '' | 1-methyl-3-(2,5-dibutoxyphenyl)-6-methylthio-s-triazine-2,4(1H,3H)-dione |
| '' | 2,4-diethylphenyl isocyanate | '' | 1-methyl-3-(2,4-diethylphenyl)-6-methylthio-s-triazine-2,4(1H,3H)-dione |
| 2-methyl-2-thiopseudourea | 2,3-dimethylcyclohexyl isocyanate | methyl iodide | 1-methyl-3-(2,3-dimethylcyclohexyl)-6-methylthio-s-triazine-2,4(1H,3H)-dione, $N_D^{25}$=1.5382 |
| '' | 2,4-dimethylcyclohexyl isocyanate | '' | 1-methyl-3(2,4-dimethylcyclohexyl)-6-methylthio-s-triazine-2,4(1H,3H)-dione, $D^{25}$ = 1.5332 |
| '' | cyclopentyl | ethyl iodide | 1-ethyl-3-cyclopentyl-6-methylthio-s-triazine-2,4(1H,3H)-dione, m.p. 68–70°C. |
| '' | '' | n-propyl iodide | 1-n-propyl-3-cyclopentyl-6-methylthio-s-triazine-2,4(1H,3H)-dione, $N_D^{25}$ = 1.5444 |
| '' | '' | n-butyl iodide | 1-n-butyl-3-cyclopentyl-6-methylthio-s-triazine-2,4(1H,3H)-dione, $N_D^{25}$ = 1.5420 |
| '' | p-ethylphenyl isocyanate | methyl iodide | 1-methyl-3-(p-ethylphenyl)-6-methylthio-s-triazine-2,4(1H,3H)-dione, m.p. 195–198° |
| '' | 3,4-xylyl isocyanate | '' | 1-methyl-3-(3,4-xylyl)-6-methylthio-s-triazine-2,4(1H,3H)-dione, m.p. 206° |
| '' | 4-chloro-3-trifluoromethylphenyliosocyanate | '' | 1-methyl-3-(4-chloro-3-trifluoromethylphenyl)-6-methylthio-s-triazine-2,4(1H,3H)-dione, m.p. 207–212° |

—Continued

| Thiopseudourea or Pseudourea | Isocyanate | Alkylating Agent | s-Triazinediones |
|---|---|---|---|
| " | 4-chloro-3-fluorophenyl isocyanate | " | 1-methyl-3-(4-chloro-3-trifluorophenyl)-6-methylthio-s-triazine-2,4(1H,3H)-dione, m.p. 180–182° |
| " | p-methoxyphenyl isocyanate | methyl iodide | 1-methyl-3-(p-methoxyphenyl)-6-methylthio-s-triazine-2,4(1H,3H)-dione, m.p. 196–201°C. |
| " | p-ethoxyphenyl isocyanate | " | 1-methyl-3-(p-ethoxyphenyl)-6-methylthio-s-triazine-2,4(1H,3H)-dione, m.p. 196.5–199°C. |
| " | 2,4-dimethylphenyl isocyanate | " | 1-methyl-3-(2,4-dimethoxyphenyl)-6-methylthio-s-triazine-2,4(1H,3H)-dione, m.p. 157–159°C. |
| " | m-iodophenyl isocyanate | " | 1-methyl-3-(m-iodophenyl)-6-methylthio-s-triazine-2,4(1H,3H)-dione, m.p. 168–174°C. |
| " | p-cyanophenyl isocyanate | " | 1-methyl-3-(p-cyanophenyl)-6-methylthio-s-triazine-2,4(1H,3H)-dione, m.p. 212–214°C. |
| 2-methylpseudourea | cyclopentyl isocyanate | methyl p-toluene sulfonate | 1-methyl-3-cyclopentyl-6-methoxy-s-triazine-2,4(1H,3H)-dione, m.p. 96–97°C. |

EXAMPLE 24

1-Methyl-3-cyclohexyl-6-methylthio-s-triazine-4-thio-2,4-(1H,3H)-dione 7.8 Parts of phosphorus pentasulfide is added to a mixture of 25.5 parts of 1-methyl-3-cyclohexyl-6-methylthio-s-triazine-2,4(1H,3H)-dione (prepared by the process described in Example 6) in 60 parts of pyridine. The mixture is refluxed for 12 hours. After cooling, 30 parts of said pyridine is removed by evaporation at reduced pressure, and 100 parts of benzene is added to the residue. The mixture is heated to reflux, and the supernatant is decanted. The residue is mixed with 100 parts of fresh benzene and heated to reflux. The supernatant is again decanted. The procedure is repeated a third time with 100 parts of benzene. The supernatants are combined and concentrated at reduced pressure, and the resulting crude produce is extracted with fresh benzene. The benzene solution is concentrated and passed into a chromatographic column containing 700 parts of activity III neutral alumina. Fresh benzene is passed through the column, and the eluate from the first 1250 parts of benzene is concentrated to dryness to give 18.6 parts of 1-methyl-3-cyclohexyl-6-methylthio-s-triazine-4-thio-2,4(1H,3H)-dione, m.p. 157°–159°C.

The following s-triazine-4-thio-2,4-(1H,3H)-diones can be prepared in a similar manner by using the appropriate reactants:

1-methyl-3-cyclohexyl-6-methylthio-4-thio-s-triazine-2,4(1H,3H)-dione m.p. 158°–159°C.
1-methyl-3-cyclopentyl-6-methylthio-4-thio-s-triazine-2,4-(1H,3H)-dione m.p. 99°–102° C.
1-methyl-3-isopropyl-6-methylthio-4-thio-s-triazine-2,4(1H,3H)-dione
1-methyl-3-tert-butyl-6-methylthio-4-thio-s-triazine-2,4-(1H,3H)-dione
1-methyl-3-cyclopentyl-6-methoxy-4-thio-s-triazine-2,4-(1-H,3H)-dione
1-methyl-3-cyclohexyl-6-methoxy-4-thio-s-triazine-2,4(1H,3H)-dione
1-methyl-3-cyclopentyl-6-ethylthio-4-thio-s-triazine-2,4(1H,3H)-dione

EXAMPLE 25

1-Methyl-3-cyclopentyl-6-methylthio-2-thio-s-triazine-2,4(1H,3H)-dione

The above named compound can be made by the following process:

Twenty-one parts of methyl N-methyl-4-cyclopentyl-1-thioallophanimidate and 20 parts of triethylamine in 200 parts of methylene chloride are added dropwise to a solution of 12 parts of thiophosgene in 200 parts of methylene chloride at 0°C. The reaction is kept at 0°C for one hour and refluxed for 10 hours. The solution is washed with water and dried. The solvent is evaporated to give a residue which is recrystallized from chlorobutane to give 1-methyl-3-cyclopentyl-6-methylthio-2-thio-s-triazine-2,4-(1H,3H)-dione.

The following thio-s-triazine-2,4-(1H,3H)-diones and s-triazine-2,4-(1H-3H)-dithiones can be prepared in a similar manner by using the appropriate reactants.

1-methyl-3-cyclohexyl-6-methylthio-2-thio-s-triazine-2,4-(1H,3H)-dione
1-methyl-3-isopropyl-6-methylthio-2-thio-s-triazine-2,4(1H,3H)-dione
1-methyl-3-tert-butyl-6-methylthio-2-thio-s-triazine-2,4-(1H,3H)-dione
1-methyl-3-cyclopentyl-6-methoxy-2-thio-s-triazine-2,4-(1H,3H)-dione
1-methyl-3-cyclohexyl-6-methoxy-2-thio-s-triazine-2,4(1H,3H)-dione
1-methyl-3-cyclopentyl-6-ethylthio-2-thio-s-triazine-2,4(1H-3H)-dione
1-methyl-3-cyclopentyl-6-methylthio-s-triazine-2,4-(1H,3H)-dithione
1-methyl-3-cyclohexyl-6-methylthio-s-triazine-2,4-(1H,3H)-dithione
1-methyl-3-isopropyl-6-methylthio-s-triazine-2,4-(1H,3H)-dithione
1-methyl-3-tert-butyl-6-methylthio-s-triazine-2,4-(1H,3H)-dithione
1-methyl-3-cyclopentyl-6-methoxy-s-triazine-2,4-(1H,3H)-dithione
1-methyl-3-cyclohexyl-6-ethoxy-s-triazine-2,4-(1H,3H)-dithione.

FORMULATION OF THE COMPOUNDS

Formulations of the compounds of Formula 1 for use in this invention can be prepared in conventional ways. They include dusts, granules, pellets, solutions, suspensions, emulsions, wettable powders, emulsifiable concentrates and the like. Many of these may be applied directly. Sprayable formulations can be extended in suitable media and used at spray volumes of from a few pints to several hundred gallons per acre. High strength compositions are primarily used as intermediates for further formulation. The formulations, broadly, contain about 1 to 99 percent by weight of active ingredient(s) and at least one of a) about 0.1 to 20 percent surfactant(s) and b) about 5 to 99 percent solid or liquid diluent(s). More specifically, they will contain these ingredients in the following approximate proportions:

| | Percent by Weight | | |
|---|---|---|---|
| | Active Ingredient | Diluent(s) | Surfactant(s) |
| Wettable Powders | 20–90 | 0–74 | 1–10 |
| Oil Suspensions, Emulsions, Solutions (including Emulsifiable Concentrates) | 5–50 | 40–95 | 0–15 |
| Aqueous Suspensions | 10–50 | 40–84 | 1–20 |
| Dusts | 1–25 | 70–99 | 0–5 |
| Granules and Pellets | 1–95 | 5–99 | 0–15 |
| High Strength Compositions | 90–99 | 0–10 | 0–2 |

Lower or higher levels of active ingredient can, of course, be present depending on the intended use and the physical properties of the compound. Higher ratios of surfactant to active ingredient are sometimes desirable, and are achieved by incorporation into the formulation or by tank mixing. Lower concentrations of active ingredient can aid in accurate application at the very low ratio reached for this invention. Sprayable and dust formulations are preferred.

As indicated above, the compounds of the invention form salts which can have enhanced solubility in water or organic solvents. They may be prepared, isolated and formulated as noted above, or salt formation may be an integral part of the formulation procedure.

Typical solid diluents are described in Watkins, et al., "Handbook of Insecticide Dust Diluents and Carriers," 2nd. Edn., Dorland Books, Caldwell, N.J. The more absorptive diluents are preferred for wettable powders and the denser ones for dusts. Typical liquid diluents and solvents are described in Marsden, "Solvents Guide," 2nd. Edn., Interscience, New York, 1950. Solubility under 0.1 percent is preferred for suspension concentrates; solution concentrates are preferably stable against phase separation at 0°C. "McCutcheon's Detergents and Emulsifiers Annual," Allured Publ. Corp., Ridgewood, N.J., as well as Sisely and Wood, "Encyclopedia of Surface Active Agents," Chemical Publ. Co., Inc., New York, 1964, list surfactants and recommended uses. All formulations can contain minor amounts of additives to reduce foam, caking, corrosion, microbiological growth, etc.

The methods of making such compositions are well known. Solutions are prepared by simply mixing the ingredients. Fine solid compositions are made by blending and, usually, grinding as in a hammer or fluid energy mill. Suspensions are prepared by wet milling (see, for example, Littler, U.S. Pat. No. 3,060,084). Granules and pellets may be made by spraying the active material upon preformed granular carriers or by agglomeration techniques. See J. E. Browning, "Agglomeration," *Chemical Engineering*, Dec. 4, 1967, pp. 147ff. and "Perry's Chemical Engineer's Handbook", 4th. Edn., McGraw-Hill, N.Y., 1963, pp. 8–59ff.

For further information regarding the art of formulation, see for example:

H. M. Loux, U.S. Pat. No. 3,235,361, Feb. 15, 1966, Col. 6, Line 16 through Col. 7, Line 19 and Examples 10 through 41.

R. W. Luckenbaugh, U.S. Pat. No. 3,309,192, March 14, 1967, Col. 5 Line 43 through Col. 7 Line 62 and Ex. 8, 12, 15, 39, 41, 52, 53, 58, 132, 138–140, 162–164, 166, 167, 169–182.

H. Gysin and E. Knusli, U.S. Pat. No. 2,891,855, June 23, 1959, Col. 3 Line 66 through Col. 5 Line 17 and Examples 1–4.

G. C. Klingman, "Weed Control as a Science," John Wiley & Sons, Inc., New York, 1961 pp. 81–96.

J. D. Fryer and S. A. Evans, "Weed Control Handbook," 5th Edn. Blackwell Scientific Publications, Oxford, 1968, pp. 101–103.

Examples of suitable formulations of compounds of the present invention include the following:

EXAMPLE 26

| Wettable Powder | Percent |
|---|---|
| 3-(4-chlorophenyl)-6-methoxy-s-triazine-2,4(1H,3H)-dione | 40 |
| dioctyl sodium sulfosuccinate | 1.5 |
| sodium ligninsulfonate | 3 |
| low viscosity methyl cellulose | 1.5 |
| attapulgite | 54 |

Thoroughly blend the ingredients then pass through an air mill to produce an average particle size under 15 microns. Reblend and sift through a U.S.S. No. 50 sieve (0.3 mm opening) before packaging.

All compounds of the invention may be formulated in the same manner.

EXAMPLE 27

| High Strength Concentrate | Percent |
|---|---|
| 3-(4-chlorophenyl)-6-methylthio-s-triazine-2,4(1H,3H)-dione | 98.5 |
| silica aerogel | 0.5 |
| synthetic amorphous fine silica | 1.0 |

Blend and grind the ingredients in a hammer mill to produce a high strength concentrate essentially all passing a U.S.S. No. 50 sieve (0.3 mm openings). This material may then be formulated in a variety of ways.

EXAMPLE 28

| Dust | Percent |
|---|---|
| high strength concentrate, Example 14 | 25.4 |
| pyrophyllite, powdered | 74.6 |

Thoroughly blend the ingredients and package for use.

EXAMPLE 29

| Aqueous Suspension | Percent |
|---|---|
| 3-(2-fluorophenyl)-6-methylthio-s-triazine-2,4(1H,3H)-dione | 25 |
| hydrated attapulgite | 3 |
| crude calcium ligninsulfonate | 10 |
| sodium dihydrogen phosphate | 0.5 |
| water | 61.5 |

Grind the ingredients together in a sand mill until the solid particles have been reduced to diameters under 10 microns.

EXAMPLE 30

| Solution | Percent |
| --- | --- |
| 3-(4-chlorophenyl)-6-methyoxy-s-triazine-2,4(1H,3H)-dione | 12.5 |
| triethanolamine | 7.7 |
| trimethylnonyloxypolyethyleneoxy ethanol | 0.2 |
| water | 79.6 |

Combine the ingredients and stir to produce a solution which can be applied directly at low volume or extended with water.

EXAMPLE 31

| Oil Suspension | Percent |
| --- | --- |
| 1-Methyl-3-(4-chlorophenyl)-6-methoxy-s-triazine-2,4(1H,3H)-dione | 25 |
| polyoxyethylene sorbitol hexaoleate | 5 |
| highly aliphatic hydrocarbon oil | 70 |

Grind the ingredients together in a sand mill until the solid particles have been reduced to under about 5 microns. The resulting thick suspension may be applied directly, but preferably after being extended with oils or emulsified in water.

USE OF THE COMPOUNDS

The compounds of formula I can be used to increase the yield of such crops as corn, wheat, rye, rice, barley, oats, sorghum, soybeans, and dry beans. Treatment of the crop during inflorescence initiation or early development with a compound of Formula I causes a greater number of inflorescences or inflorescences with increased numbers of florets to develop. With respect to the cereal grain crops, under favorable growing conditions, the increased spikelet or ear growth (increased number of developing florets) results in larger and more productive inflorescences thereby increasing grain yields per unit of area. Yields of soybeans and dry beans can also be increased.

The rate of treatment will vary from about 174 to about 5 Kg/Ha depending on the compound used and the species treated.

As mentioned above, the compounds of Formula I can be used to increase the yield of a number of varied and diverse crops when applied at the proper rate and during inflorescence initiation or early development thereof. The time for applying the compound to achieve an optimum effect will vary depending upon a variety of factors, including the particular crop being treated, soil conditions, weather conditions, and to some extent even the particular compound being applied. As can be seen by a comparison of the present application with the above-mentioned U.S. Ser. No. 325,359 and 301,852, many of the compounds which are useful in the method of the present invention also exhibit utility with respect to the method defined in these two other applications. In effect, what appears to be occurring is that a single compound can possess two very different activities, which, depending on, among other things, the time of application, will compete with one another for dominance. In general, the yield increase effect will dominate when the compounds of Formula I are applied during inflorescence initiation or early development thereof.

Generally speaking, and, again, depending on the factors mentioned above, the method of the present invention is practiced by applying the compounds of Formula I to plants such as corn and sorghum between 12 and 50 days prior to initial pollen shed. Under what can be characterized as average or normal growing conditions, it is preferred to apply the compounds at 14 to 30 days prior to initial pollen shed. Under such conditions it is most preferred to apply the compounds at approximately 16 to 20 days prior to initial pollen shed.

In a similar manner with respect to small grains such as wheat, rye, rice, barley, and oats, the method of the present invention can be practiced by applying the compounds of Formula I to such small grain plants between 20 and 70 days prior to initial pollen shed. Under average or normal growing conditions, it is preferred to apply the compounds at 30 to 60 days prior to initial pollen shed. It is most preferred to apply the compounds at approximately 40 to 50 days prior to initial pollen shed.

Similarly, with respect to soybeans and the various dry beans the compound can be applied to the plants between 1 and 21 days prior to initial pollen shed, with the preferred and most preferred times of application under normal growing conditions being 3 to 14 days and approximately 6 to 10 days, respectively, prior to initial pollen shed. It is emphasized that all of these time limits are subject to minor fluctuations, particularly under extreme soil or weather conditions.

The ability of 3-(4-chlorophenyl)-6-methoxy-s-triazine-2,4(1H,3H)-dione and related compounds of Formula I to increase the yield of cereal grains, soybeans, and dry beans is demonstrated as follows:

Tobari 66 spring wheat, greenhouse grown in pots 13 cm. in diameter, was foliarly sprayed with compounds of this invention. Main plants (6–8 per pot) were at the "boot stage" and sucker plants were less developed. A suitable quantity of solvent was used to insure adequate coverage of plants sprayed as they rotated on a turntable. Three replicates (pots) were included in each case except that for the solvent control, 4 replicates were included. Late developing heads were allowed to mature and average yields per pot are indicated in the table below.

| Compounds | Rate, Kg/Ha | Number of heads | Number of Seeds | Seed Wt.(g) |
| --- | --- | --- | --- | --- |
| 3-(4-chlorophenyl)-6-methoxy-s-triazine-2,4(1H,3H)-dione salt with triethanol amine | 2.2 | 9 | 88 | 1.6 |
|  | .55 | 14 | 68 | 1.3 |
| 3-(4-chlorophenyl)-6-methoxy-s-triazine-2,4(1H,3H)-dione | 2.2 | 10 | 47 | 1.0 |
|  | .55 | 14 | 78 | 1.5 |
| Solvent Control |  | 9 | 43 | 1.1 |

Some late developing heads in treated pots bore as many as 11 and 12 florets per spikelet while controls bore only 5–7 florets per spikelet.

Plots of Red Coat winter wheat 1.52 × 3.04 meters were treated with the triethanolamine salt of 3-(4-chlorophenyl)-6-methoxy-s-triazine-2,4(1H,3H)-dione. Foliar sprays were applied at 0.56, 1.12, 2.24, or 4.48 kg/ha. with three replications. Heads were harvested at maturity and 100 from each plot were weighed as a measure of yield. Weight of heads was increased by suitable treatments as indicated below:

| Compound | Rate (Kg/Ha) | Mean Head Weight as % of Untreated Check Stage of Treatment | |
|---|---|---|---|
| | | Early Joint | Joint |
| 3-(4-chlorophenyl)-6-methoxy-s-triazine-2,4(1H,3H)-dione salt with triethanol amine | 0.56 | 101 | 96 |
| | 1.12 | 109 | 96 |
| | 2.24 | 107 | 103 |
| | 4.48 | 98 | 98 |
| Untreated | | 100[a] | 100[b] |

[a] (75.4 grams per 100 heads)
[b] (75.8 grams per 100 heads)

Florida Black Rye was planted and after 10 weeks, the plants were treated with a foliar-soil spray of 3-(4-chlorophenyl)-6-methoxy-s-triazine-2,4(1H,3-H)-dione at the rates shown in the table below. Nineteen dayas after treatment, the number of heads per twenty feet of row was counted. The figures below are the averages of three replicates:

| Compound | Rate, Kg/Ha | Number of Heads |
|---|---|---|
| 3-(4-chlorophenyl)-6-methoxy-s-triazine-2,4(1H,3H)-dione | .55 | 184 |
| | 1.11 | 212 |
| | 2.20 | 194 |
| | 4.40 | 296 |
| Untreated | — | 127 |

FR 805 W inbred field corn was sprayed with 3-(4-chlorophenyl)-6-methoxy-s-triazine-2,4(1H,3H)-dione at rates of 2.2 and 4.4 kilograms per hectare at about two weeks before initial pollen shed. The number of kernels on treated cars was increased due to the stimulation of development of the sterile florets normally present in each spikelet. The number of kernels on 5.08 cm. segments of 3 ears was counted and is indicated in the table below:

| Compound | Rate, Kg/Ha | Numbers of kernels per cm. of ear length |
|---|---|---|
| 3-(4-chlorophenyl)-6-methoxy-s-triazine-2,4(1H,3H)-dione | 2.2 | 41.9 |
| | 4.4 | 45.9 |
| Untreated | — | 31.2 |

Application of 3-(4-chlorophenyl-6-methoxy-s-triazine-2,4(1H,3H)-dione on corn three weeks or more before pollen shed stimulates pistillate flowers to develop on the tassels. These flowers then bear viable seed.

The single cross parent lines of McNair 508 hybrid field corn were grown in 34-foot plots. Using 3 replications, treatments of 3-(4-chlorophenyl)-6-methoxy-s-triazine-2,4(1H,3H)-dione salt with triethanol amine were sprayed on the maternal parent in 421 liters of water per hectare. Rates of 0.56, 1.12, and 2.24 kilograms per hectare were applied at 3 stages of plant development. These stages were (A) tassels about half way up the "boots" (about 3 ½ weeks before initial pollen shed), (B) 10 days after stage "A" when tips of some tassels were visible above the whorls and (C) tassels fully emerged and expanded but not shedding pollen (17 days after stage A). Adjacent paternal parent rows in each plot were not sprayed and provided uniform pollination. A random sample of 20 ears per plot was harvested at maturity. Average ear weight and yield of grain per ear was increased by suitably timed treatments as indicated below:

| Compound | Rate Kg/Ha | Stage | Yield (grams per ear) | |
|---|---|---|---|---|
| | | | Grain | Grain & Cob |
| 3-(4-chlorophenyl)-6-methoxy-s-triazine-2,4(1H,3H)-dione salt with triethanol amine | 0.56 | A | 227.8 | 267.2 |
| | | B | 238.3 | 281.1 |
| | | C | 216.6 | 256.0 |
| | 1.12 | A | 235.5 | 283.2 |
| | | B | 233.3 | 276.8 |
| | | C | 219.4 | 259.8 |
| | 2.24 | A | 239.1 | 283.9 |
| | | B | 238.4 | 282.1 |
| | | C | 222.2 | 262.0 |
| Untreated Control | | A | 220.6 | 258.1 |
| | | B | 275.7 | 254.2 |
| | | C | 214.9 | 252.4 |

Oat plants, greenhouse grown in pots 13 cm. in diameter, were sprayed with 3-(4-chlorophenyl)-6-methoxy-s-triazine-2,4(1H,3H)-dione salt with triethanol amine during early inflorescence development. At maturity grain was harvested from the dominant shoots in each pot (2 plants per pot). Grain yields were increased. Stage of treatment and average number of grains produced per pot (3 replications) are shown below:

| Compound | Rate Kg/Ha | Height of Oat Plants When Sprayed (cm) | Yield (Number) of Oat Grains per Pot(2 shoots) |
|---|---|---|---|
| 3-(4-chlorophenyl)-6-methoxy-s-triazine-2,4(1H,3H)-dione salt with triethanol amine | 1.12 | 38.0 | 24 |
| Solvent Control | — | — | 10 |

Analogous results can be obtained by spraying soybeans with the triethanolamine salt of 3-(4-chlorophenyl)-6-methoxy-s-triazine-2,4(1H,3H)-dione after the plants reach the trifoliolate leaf stage but before initial flowering. The compound should be dissolved in water and applied at the rate of 0.25 kilograms per 200 liters per hectare. Similarly, the yield of dry beans can also be increased by spraying dry beans in the first trifoliolate leaf stage with the triethanolamine salt of 3-(4-chlorophenyl)-6-methoxy-s-triazine-2,4(1H,3H)-dione at the rate of 0.25 kilograms per 200 liters of water per hectare.

What is claimed is:

1. Method for increasing the yield of wheat crops which comprises applying an s-triazinedione to the crop plant during inflorescence initiation or early development and in an amount sufficient to increase the number of inflorescences or the number of florets per inflorescence without causing substantial foliar burn, chlorosis, or necrosis, the s-triazinedione being a compound of the formula

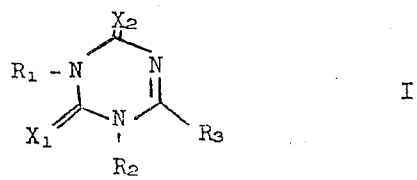

wherein
$R_1$ is phenyl or substituted phenyl, and
$R_2$ is hydrogen or a cation selected from lithium, sodium, potassium, calcium, magnesium, barium, or

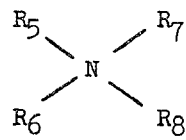

where
- $R_5$, $R_6$, and $R_7$ can be the same or different and each can be hydrogen, alkyl of 1 through 4 carbon atoms or hydroxy alkyl of 2 through 4 carbon atoms; and
- $R_8$ is hydrogen, alkyl of 1 through 12 carbon atoms or benzyl;
- $R_5$ and $R_6$ can be taken together to form a ring that is —$(CH_2)_2$—O—$(CH_2)_2$— or —$(CH_2)_n$— where n is 4 through 6 and $R_7$ and $R_8$ are hydrogen.

2. Method of claiam 1 wherein $R_1$ is monohalophenyl or dihalophenyl.

3. Method of claim 2 wherein the s-triazinedione is 3-(4-chlorophenyl)-6-methoxy-s-triazine-2,4-(1H,3H)-dione and salts thereof.

4. Method for increasing the yield of rye crops which comprises applying an s-triazinedione to the crop plant during inflorescence initiation or early development and in an amount sufficient to increase the number of inflorescences or the number of florets per inflorescence without causing substantial foliar burn, chlorosis, or necrosis, the s-triazinedione being a compound of the formula

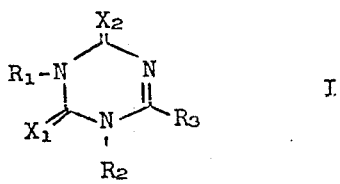 I.

wherein
- $R_1$ is phenyl or substituted phenyl and
- $R_2$ is hydrogen or a cation selected from lithium, sodium, potassium, calcium, magnesium, barium, or

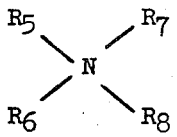

where
- $R_5$, $R_6$, and $R_7$ can be the same or different and each can be hydrogen, alkyl of 1 through 4 carbon atoms or hydroxy alkyl of 2 through 4 carbon atoms; and
- $R_8$ is hydrogen, alkyl of 1 through 12 carbon atoms or benzyl;
- $R_5$ and $R_6$ can be taken together to form a ring that is —$(CH_2)_2$—O—$(CH_2)_2$— or —$(CH_2)_n$— where n is 4 through 6 and $R_7$ and $R_8$ are hydrogen.

5. Method of claim 4 wherein $R_1$ is monohalophenyl or dihalophenyl.

6. Method of claim 5 wherein the s-triazinedione is 3-(4-chlorophenyl)-6-methoxy-s-triazine-2,4(1H,3H)-dione and salts thereof.

7. Method for increasing the yield of corn crops which comprises applying an s-triazinedione to the crop plant during inflorescence initiation or early development and in an amount sufficient to increase the number of inflorescences or the number of florets per inflorescence without causing substantial foliar burn, chlorosis, or necrosis, the s-triazinedione being a compound of the formula:

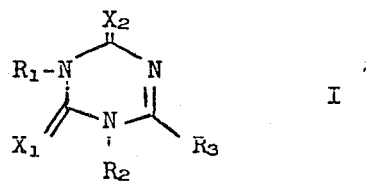 I wherein
- $R_1$ is phenyl or substituted phenyl and
- $R_2$ is hydrogen or a cation selected from lithium, sodium, potassium, calcium, magnesum, barium, or

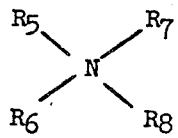

where
- $R_5$, $R_6$, and $R_7$ can be the same or different and each can be hydrogen, alkyl of 1 through 4 carbon atoms or hydroxy alkyl of 2 through 4 carbon atoms; and
- $R_8$ is hydrogen, alkyl of 1 through 12 carbon atoms or benzyl;
- $R_5$ and $R_6$ can be taken together to form a ring that is —$(CH_2)_2$—O—$(CH_2)_2$— or —$(CH_2)_n$— where n is 4 through 6 and $R_7$ and $R_8$ are hydrogen.

8. Method of claim 7 wherein $R_1$ is monohalophenyl or dihalophenyl.

9. Method of claim 8 wherein the s-triazinedione is 3-(4-chlorophenyl)-6-methoxy-s-triazine-2,4(1H,3H)-dione and salts thereof.

* * * * *

UNITED STATES PATENT OFFICE
CERTIFICATE OF CORRECTION

PATENT NO. : 3,901,682
DATED : August 26, 1975
INVENTOR(S) : James D. Long

It is certified that error appears in the above-identified patent and that said Letters Patent are hereby corrected as shown below:

In each of claims 1, 4 and 7, replace the period at the end of the claim with a comma; and insert immediately thereafter:

-- $R_3$ is $SR_4$ or $OR_4$ where $R_4$ is methyl or ethyl, and $X_1$ and $X_2$ are oxygen or sulfur. --

Signed and Sealed this thirteenth Day of April 1976

[SEAL]

Attest:

RUTH C. MASON
Attesting Officer

C. MARSHALL DANN
Commissioner of Patents and Trademarks